US009808778B2

(12) United States Patent
Farrar et al.

(10) Patent No.: US 9,808,778 B2
(45) Date of Patent: Nov. 7, 2017

(54) MECHANICAL SYSTEM THAT CONTINUOUSLY PROCESSES A COMBINATION OF MATERIALS

(71) Applicant: Resodyn Corporation, Butte, MT (US)

(72) Inventors: Lawrence C. Farrar, Butte, MT (US); Scott L. Coguill, Butte, MT (US); Peter A. Lucon, Butte, MT (US); Janice Lucon, Butte, MT (US)

(73) Assignee: Resodyn Corporation, Butte, MT (US)

( * ) Notice: Subject to any disclaimer, the term of this patent is extended or adjusted under 35 U.S.C. 154(b) by 0 days.

(21) Appl. No.: 13/965,964

(22) Filed: Aug. 13, 2013

(65) Prior Publication Data
US 2013/0329514 A1 Dec. 12, 2013

Related U.S. Application Data

(63) Continuation-in-part of application No. PCT/US2013/043755, filed on May 31, 2013.
(Continued)

(51) Int. Cl.
*B01F 11/02* (2006.01)
*B01F 11/00* (2006.01)
(Continued)

(52) U.S. Cl.
CPC ...... *B01F 11/0266* (2013.01); *B01F 11/0077* (2013.01); *B01J 4/002* (2013.01);
(Continued)

(58) Field of Classification Search
CPC .... B01F 11/0266; B01F 11/02; B01F 5/0604; B01F 5/0605; B01F 5/0606; B01F 5/0608;
(Continued)

(56) References Cited

U.S. PATENT DOCUMENTS 3,045,984 A    7/1962  Cochran
3,826,740 A *  7/1974  Jewett ...................... C02F 1/52
                                                      210/521
(Continued)

FOREIGN PATENT DOCUMENTS

EP       1402939 A2    3/2004
EP       1 972 296 A1  9/2008
(Continued)

OTHER PUBLICATIONS

International Search Report and Written Opinion dated Oct. 24, 2013 in PCT Application No. PCT/US2013/043755 (10 pages).
(Continued)

*Primary Examiner* — Tony G Soohoo
*Assistant Examiner* — Elizabeth Insler
(74) *Attorney, Agent, or Firm* — McDermott Will & Emery LLP

(57) ABSTRACT

The present application is directed towards systems and methods for continuously reacting a combination of materials by use of an acoustic agitator and a continuous process vessel. The system can react, fluidize, mix, coat, dry, combine or segregate materials. The continuous processing system can include an acoustic agitator capable of being removably coupled to a continuous process vessel. The continuous process vessel can include a first inlet for introducing at least one process ingredient, a plurality of plates configured for directing a flow of the at least one process ingredient through the continuous process vessel and capable of transferring acoustic energy generated by the acoustic agitator into the at least one process ingredient, an outlet for discharging a product of the at least one process ingredient, and a fastener for removable coupling the continuous process vessel to the acoustic agitator.

26 Claims, 30 Drawing Sheets

Related U.S. Application Data

(60) Provisional application No. 61/742,923, filed on Aug. 20, 2012, provisional application No. 61/689,256, filed on May 31, 2012.

(51) Int. Cl.
  *B01J 19/10* (2006.01)
  *B01J 8/34* (2006.01)
  *B01J 8/40* (2006.01)
  *B01J 19/00* (2006.01)
  *B01J 4/00* (2006.01)

(52) U.S. Cl.
  CPC . *B01J 8/34* (2013.01); *B01J 8/40* (2013.01); *B01J 19/006* (2013.01); *B01J 19/10* (2013.01); *B01J 2208/0015* (2013.01); *B01J 2208/0061* (2013.01); *B01J 2208/0084* (2013.01); *B01J 2208/00867* (2013.01); *B01J 2208/00902* (2013.01); *B01J 2208/00938* (2013.01); *B01J 2219/0077* (2013.01); *B01J 2219/00085* (2013.01); *B01J 2219/00772* (2013.01); *B01J 2219/00777* (2013.01)

(58) Field of Classification Search
  CPC ..... B01F 5/061; B01F 2005/0626; B01J 8/16; B01J 19/10; B01J 19/285; B01J 2219/00484; G01F 13/026
  USPC .................................. 366/111, 336; 222/199
  See application file for complete search history.

(56) References Cited

U.S. PATENT DOCUMENTS

| | | | |
|---|---|---|---|
| 4,848,673 A | | 7/1989 | Masuda et al. |
| 5,460,209 A | * | 10/1995 | Jandura ................ G01G 13/024 141/104 |
| 5,473,700 A | | 12/1995 | Fenner, Jr. |
| 6,607,008 B1 | | 8/2003 | Yoshimoto et al. |
| 7,188,993 B1 | * | 3/2007 | Howe ..................... B06B 1/161 366/111 |
| 2003/0044332 A1 | * | 3/2003 | Conrad ................ B01F 3/0446 422/232 |
| 2006/0266967 A1 | | 11/2006 | Miura |
| 2007/0267351 A1 | * | 11/2007 | Roach ................ B01F 11/0283 210/695 |
| 2010/0096936 A1 | | 4/2010 | Bae et al. |
| 2012/0121469 A1 | | 5/2012 | Hiller et al. |

FOREIGN PATENT DOCUMENTS

| | | | |
|---|---|---|---|
| EP | 2 793 221 A1 | 10/2014 | |
| JP | S45-2510 | 1/1970 | |
| JP | S58223429 | 12/1983 | |
| JP | 63-028434 A | 2/1988 | |
| JP | H07-004834 | 1/1995 | |
| JP | H07-019728 | 1/1995 | |
| JP | 10-128094 A | 5/1998 | |
| JP | H11248349 | 9/1999 | |
| JP | 2000501651 A | 2/2000 | |
| JP | 2001-293347 A | 10/2001 | |
| JP | 2004-123717 A | 4/2004 | |
| JP | 2004230272 A | 8/2004 | |
| JP | 2008-183168 A | 8/2008 | |
| JP | 2009277679 A | 11/2009 | |
| JP | 2010-515565 A | 5/2010 | |
| JP | 2010-539289 A | 12/2010 | |
| WO | WO-2008/029311 A1 | 3/2008 | |
| WO | WO 2008029311 A1 * | 3/2008 | ............ B01F 5/0618 |
| WO | WO-2008/103622 A1 | 8/2008 | |
| WO | WO-2013/089239 A1 | 6/2013 | |

OTHER PUBLICATIONS

International Search Report and Written Opinion dated Feb. 18, 2014 in PCT Application No. PCT/US2013/054739 (19 pages).
Invitation to Pay Additional Fees and, Where Applicable, Protest Fee mailed on Nov. 13, 2013 in PCT Application No. PCT/US2013/054739.
International Preliminary Report on Patentability dated Dec. 11, 2014 in PCT Application No. PCT/US2013/043755.
International Preliminary Report on Patentability dated Mar. 5, 2015 in PCT Application No. PCT/US2013/054739.
International Search Report and Written Opinion dated May 26, 2015 in PCT Application No. PCT/US2014/061768.
JP Office Action received in Appl. No. 2015-515268, dated Feb. 1, 2016.
Office Action issued in European Patent Application No. 13753377.4 dated Mar. 7, 2016, 4 pages.
Office Action issued in Japanese Patent Application No. 2015-528520 dated Mar. 7, 2016, and English translation thereof, 17 pages.
Office Action issued in Japanese Patent Application No. 2015-528520 dated Nov. 14, 2014, and English translation thereof, 6 pages.
Office Action in European Patent Application No. 13753377.4 dated Feb. 6, 2017.
Final Office Action in Japanese Patent Application No. 2015-515268 dated Dec. 19, 2016.
Notice of Allowance in Japanese Patent Application No. 2015-528520 dated Feb. 6, 2017.
Restriction Requirement issued May 25, 2017 in U.S. Appl. No. 14/402,505.

* cited by examiner

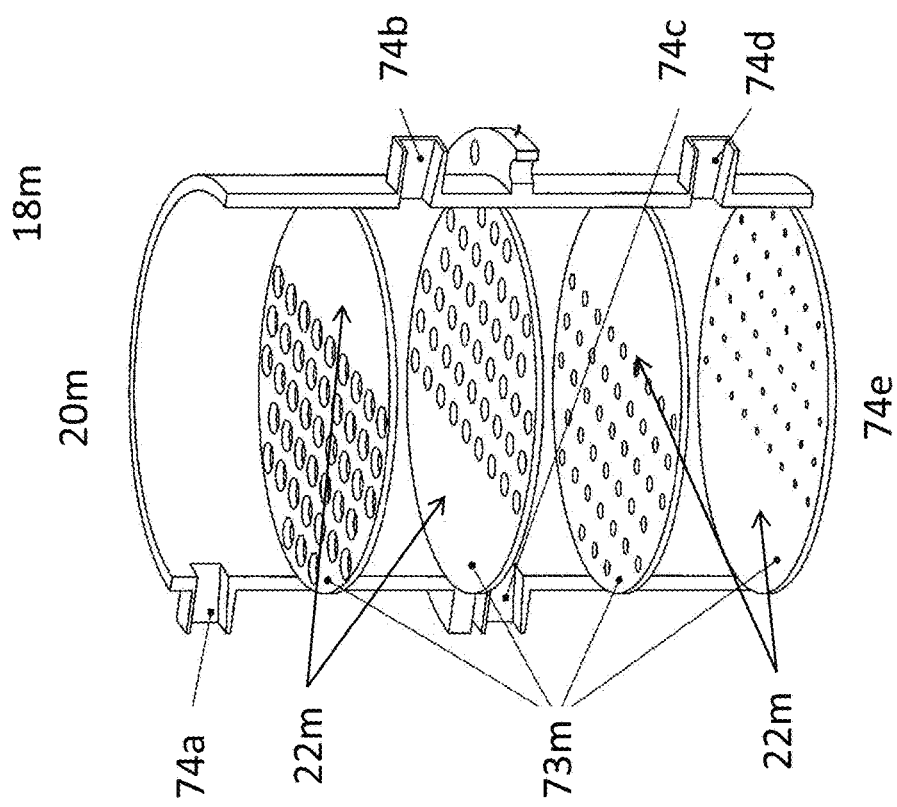

Residence time washout function of CAR compared to other systems.

MECHANICAL SYSTEM THAT CONTINUOUSLY PROCESSES A COMBINATION OF MATERIALS

RELATED APPLICATIONS

This patent application claims the benefit of U.S. Provisional Patent Application No. 61/742,923, filed on Aug. 20, 2012, entitled "Continuous Acoustic Processing." This patent application is a continuation-in-part of International Application No. PCT/US2013/043755, filed on May 31, 2013, entitled "Mechanical System That Fluidizes, Mixes, Coats, Dries, Combines, Chemically Reacts, and Segregates Materials" which claims the benefit of U.S. Provisional Patent Application No. 61/689,256, filed on May 31, 2012, entitled "Mechanical System That Fluidizes, Mixes, Coats, Dries, Combines, Chemically Reacts, or Segregates Materials." The disclosure of each of the aforementioned applications is incorporated herein by reference.

FIELD

The present application is in the technical field of continuous processing of materials.

BACKGROUND

Current methods and systems for continuously processing materials do not produce uniformly mixed, reacted, coated or combined materials. Use of current continuous flow reactors, such as continuous stirred tank reactor systems, can result in non-uniform reacting of materials. Similarly, current methods for continuously combining materials are costly and time consuming.

BRIEF SUMMARY

The present application is directed towards mechanical systems and methods that continuously fluidize, mix, coat, dry, combine, chemically react and/or segregate materials utilizing acoustic agitation technology. The application of acoustic agitation technology and continuous processing of materials provides a method to combine, react, mix, dry, and/or coat materials uniformly, while reducing the space needed for equipment to carry out these processes and increasing the efficiency of the process. More particular, an acoustic agitator coupled to a continuous process vessel can produce low frequency acoustic energy that mixes materials in a continuous process vessel in a uniform and even fashion. This continuous processing system, as will be described in greater detail below, can also be equipped with a single, or a plurality of options, such as temperature sensors; vacuum pressure; heating and cooling mechanisms; filters; mixedness sensors; and sieves to optimize the continuous process vessel's ability to mix, combine, dry, coat, segregate, and react materials.

In one aspect, the disclosure is related to a system for continuously processing a combination of materials. The system includes an acoustic agitator capable of being removably coupled to a process vessel and a continuous process vessel. The continuous process vessel includes a first inlet configured for introducing at least one process ingredient; a plurality of plates configured for directing a flow of the at least one process ingredient through the continuous process vessel and capable of transferring acoustic energy generated by the acoustic agitator into the at least one process ingredient; and an outlet for discharging a product of the at least one process ingredient subsequent to the at least one process ingredient passing through at least a portion of the continuous process vessel while being exposed to the acoustic energy transferred by at least one of the plurality of plates. The system also includes a fastener for removably coupling the continuous process vessel to the acoustic agitator.

In some implementations, the first inlet is positioned in the top of the process vessel and the process vessel is configured with multiple levels, each level includes at least one of the plurality of plates. The plate angle of at least two of the plurality of plates can be arranged at different angles. The plate angle can range from 1 degree to 75 degrees. The surface of the plurality of plates can have a plurality of openings to serve as a sieve. The plurality of plates can further include an orifice to allow the at least one process ingredient to flow to a next level in the process vessel. The orifice can further include a means for adjusting the size of the orifice. The size of the orifice can range from a few tenths of an inch to several inches. The system can further include a baffle coupled to or formed integrally with at least one of the plurality of plates.

In other implementations, the fastener can be substantially permanently affixed to, or formed integrally with, one of the acoustic agitator and the continuous process vessel. The fastener can include at least one of a screw, nail, nut, bolt, clamp, threaded fastener, latch, buckle or button. The system can include detachable sections to create a process vessel of adjustable size. The system can further include multiple fasteners to join the detachable sections of the process vessel together. The detachable sections can comprise spacer sections and plate sections.

A grinding media can be disposed within the process vessel between at least two of the plurality of plates. In some implementations, a means for controlling the temperature of the plurality of plates can be disposed within the process vessel. The system can include a fluid pathway for carrying coolant to cool the plurality of plates. In other implementations, the system can include a fluid pathway for carrying a heated fluid to heat the plurality of plates. In still other implementations, the system can include a resistive heating element. The process vessel can include a cavity positioned between an inner wall and an outer wall of the process vessel. The cavity can further house a cooling or heating means to control the temperature of the process vessel.

In some implementations, the system can include a spray nozzle coupled to the process vessel, in addition to the first inlet, to introduce the plurality of materials. The system can include multiple spray nozzles coupled to the process vessel and a plurality of ports coupled to the process vessel to extract or inject materials into the process vessel. The system can include an outlet valve coupled to the process vessel and a level sensor coupled to the process vessel to control the outlet valve.

In another aspect of the present disclosure, a method for continuously processing a combination of materials is described. The method includes providing, by an acoustic agitator, acoustic energy and removably coupling a continuous process vessel to the acoustic agitator. The continuous process vessel includes a plurality of plates configured for directing a flow of at least one process ingredient through the continuous process vessel and capable of transferring the acoustic energy generated by the acoustic agitator into the at least one process ingredient. The method can further include introducing, by a first inlet, the at least one process ingredient and discharging, by an outlet, a product of the at least one process ingredient subsequent to the at least one process ingredient passing through at least a portion of the continuous process vessel while being exposed to the acoustic energy transferred by at least one of the plurality of plates.

In some implementations, the method can include introducing the at least one process ingredient from a spray nozzle coupled to the process vessel. The method can further include injecting the at least one process ingredient from multiple spray nozzles and a plurality of ports coupled to the process vessel. In other implementations, the method can include extracting the at least one process ingredient from a plurality of ports coupled to the process vessel. In still other implementations, the method can include controlling a flow of the at least one process ingredient to a next level the process vessel, wherein the process vessel includes multiple levels, with each level including at least one of the plurality of plates. The method can include controlling the flow by adjusting a size of an orifice through one of the plurality of plates and/or by changing a plate angle of at least one of the plurality of plates. Further, the method can include grinding the at least one process ingredient in the process vessel. In still other implementations, the method can include sifting the at least one process ingredient in the process vessel.

In some implementations, the method can include controlling the temperature of at least one of the plurality of plates. The method can include controlling the temperature of the process vessel.

In other implementations, the method can include configuring at least two of the plurality of plates to allow the at least one process ingredient to come into contact with the bottom surface of one of the two plates and a top surface of the other of the two plates.

BRIEF DESCRIPTION OF THE FIGURES

The foregoing and other objects, aspects, features, and advantages of the disclosure will become more apparent and better understood by referring to the following description taken in conjunction with the accompanying drawings, in which:

FIGS. 14-16 are cutaway perspective views of various additional example implementations of a continuous process vessel;

DETAILED DESCRIPTION OF THE INVENTION

Figure 1:
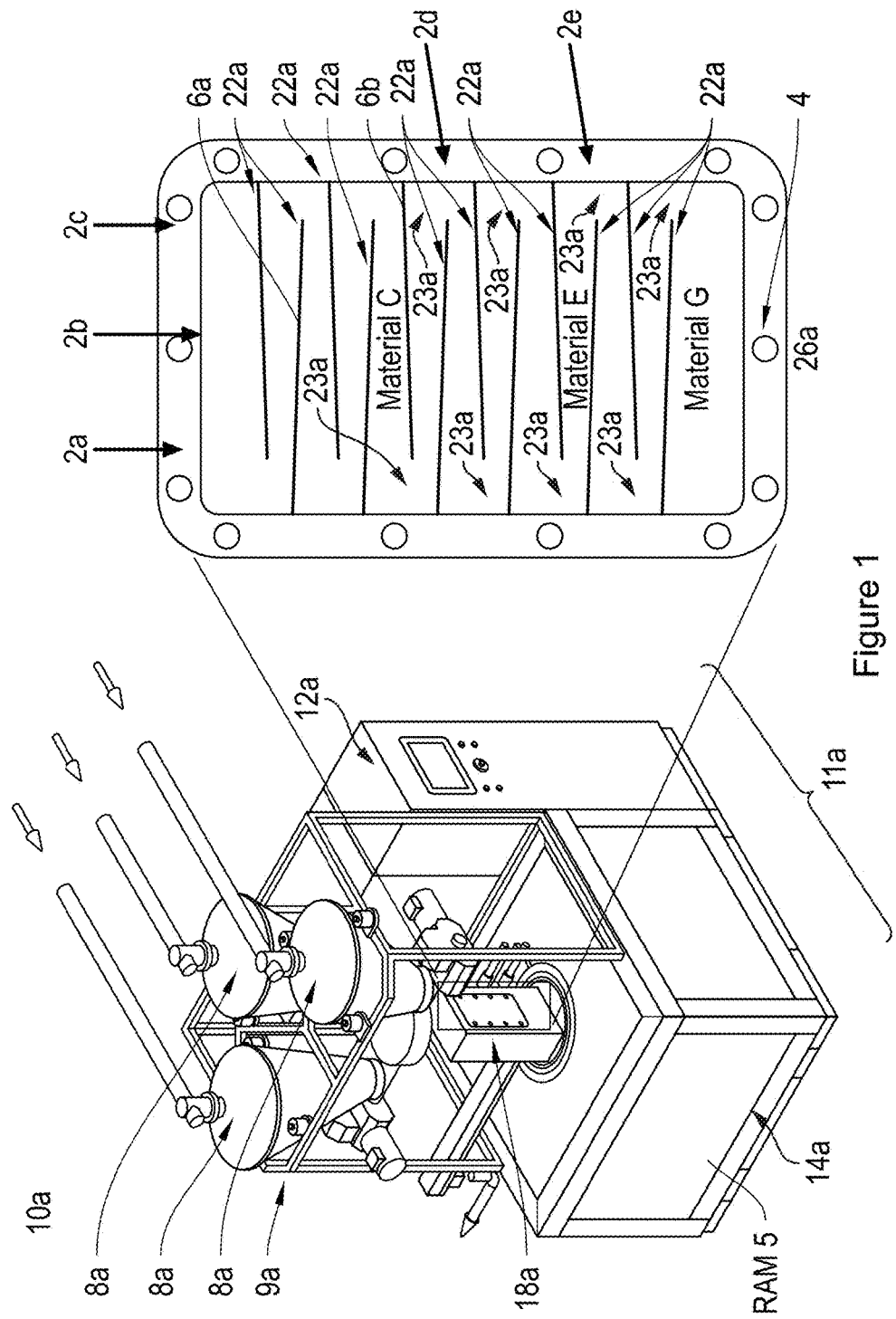
FIGS. 1-3 are perspective views of a continuous processing system mounted on an acoustic agitator.

A continuous processing system is described herein that has distinctive features that separate it from other mixers currently available, such as laminar regime mixers. The continuous processing system operates at mechanical resonance that enables large vibrational amplitudes at low-frequencies, for example, in the range of between about 30 Hz to about 1 kHz. In some implementations, the system operates at about 60 Hz. These large amplitudes create a strong sinusoidal acoustic field inside of a mixing reactor or a continuous process vessel, which provides efficient and intense mixing and reacting. Additionally, the displacement of plates disposed within the continuous process vessel can impose large acceleration forces on the materials to increase the efficiency and intensity of the mixing and reacting. Low-frequency, high-intensity acoustic energy is used to create a near uniform shear field throughout substantially the entire continuous process vessel, which results in rapid fluidization, reaction and/or dispersion of materials. Operation at such high accelerations puts large mechanical stresses into the components of the process vessel, but, as the process vessel is oscillated at or near resonance, the operation of the device can be quite efficient. Because of these features, the reliability of the equipment at extreme operating conditions is substantially improved and enables the technology to be scaled. Such systems are applicable to a wide variety of reactions and mixing applications.

Low frequency acoustic agitation (LFAA) differs from ultrasonic mixing in that the frequency of acoustic energy is orders of magnitude lower. Most ultrasonic (>20 kHz) energies are fully absorbed by the material immediately in front of the ultrasonic transducer. LFAA mixing utilizes acoustic energy, in some implementations nominally at 60 Hz (though at other frequency less than 1 kHz in other implementations), that fully penetrates substantially the entire contents of a process vessel. The acoustic energy produced by the LFAA can range from a few g's to hundreds of g's. Unlike impeller agitation, which mixes by inducing bulk flow with eddies generated at the impeller edges, the LFAA mixing occurs on a microscale substantially uniformly throughout the mixing volume. Additional interactions with the vessel walls cause beneficial bulk flow. Sound waves radiating from the reactor plates are attenuated, scattered, reflected, or propagated as they transmit through a non-homogeneous media. Attenuation creates an energy gradient which corresponds to a body force onto the media being mixed. This force induces macro flow in the media referred to as acoustic streaming. The acoustic streaming, along with the interaction between the media and the mixing vessel, results in the micro-mixing of the media. Because the acoustic field forms throughout the process vessel there are low and in many cases no mixing dead zones and the shear may be near evenly distributed throughout the process vessel once the materials are fluidized. The scattering and reflected waves also create body forces on sub-elements of the media with volumes of different density. Depending on the density ratio and material viscosity, these body forces can be significant or negligible in performing micro mixing. In some implementation, both the top and the bottom of each plate within a process vessel, impart acoustic energy on the mixture as it travels through each level of the vessel.

Continuous Processing System

Figure 2:
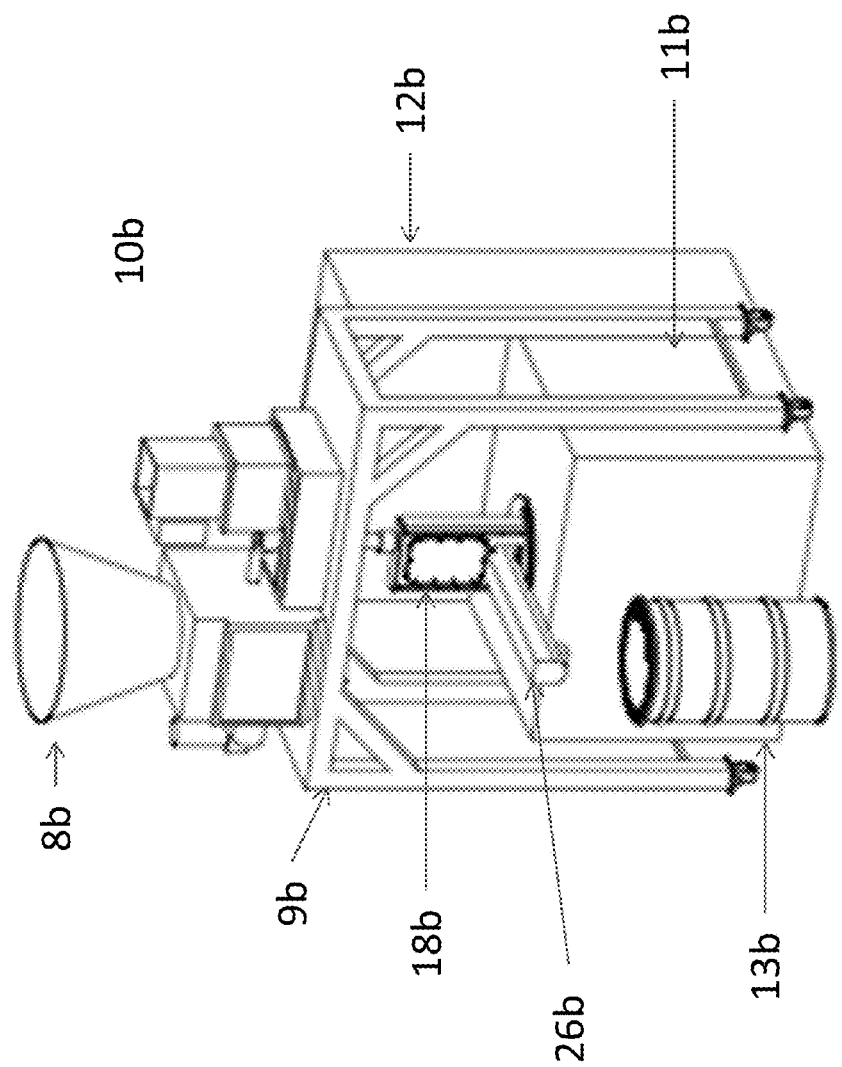
Figure 3:
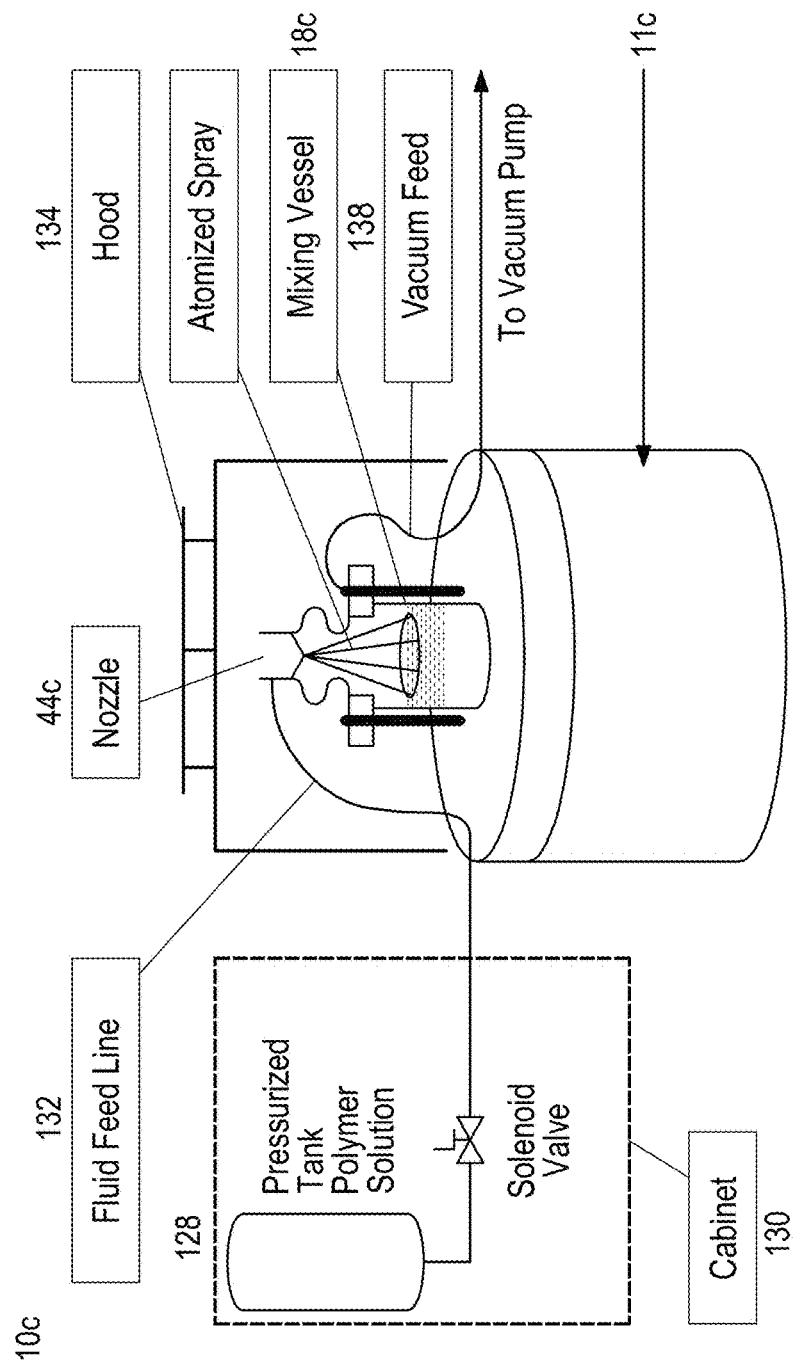

FIGS. 1-3, show different examples of a continuous processing system 10. The continuous processing system 10 can include an acoustic agitator 11 and a continuous process vessel 18. The process vessel 18 can include a first inlet 20 configured for introducing at least one process ingredient, a plurality of plates 22 configured for directing a flow of the process ingredients through the process vessel 18, and which are capable of transferring acoustic energy generated by the acoustic agitator 11 into the process ingredients, an outlet 26 for discharging a product of the process ingredients subsequent to the process ingredients passing through a portion of the process vessel 18 while being exposed to the acoustic energy, and a fastener 30 for removably coupling the process vessel 18 to the acoustic agitator 11. The shape of the process vessel 18 can be configured in a variety of different implementations and can include many different components, as will be discussed in greater detail below. The different implementations of the process vessel 18 can support a variety of processes, for example mixing, combining, drying, coating, segregating, and reacting of process ingredients.

FIG. 1 shows an illustrative implementation of a continuous processing system 10a. In FIG. 1, the processing system 10a includes a process vessel 18a coupled to an acoustic agitator 11a. The acoustic agitator 11a can include an electrical cabinet 12a and a resonance assembly 14a. The acoustic agitator 11a can be a RAM® Mixer (RAM), such as those available from Resodyn Acoustic Mixers (Butte, Mont.). The processing system 10a further includes multiple conduits 2a to deliver the materials to the processing system and multiple hoppers 8a to hold the materials prior to being introduced into the process vessel 18a. The conduits 2a can be any type of pipe, conduit or hose used for delivering materials, such as a solid, gas or fluid. The hoppers 8a can have any type of closed geometric figure with a hollow body to hold or transfer materials into the process vessel 18a, for example a container, barrel, funnel, or vat. The conduits 2a and hoppers 8a can be coupled to the processing system 10a by a support frame 9a. The support frame 9a can be an open structure to connect and hold the components of the processing system 10a together. The support frame 9 can be coupled to the acoustic agitator 11a, the process vessel 18a, and the hoppers 8a. The support frame 9a can be made up of multiple sections.

FIG. 1 further shows a cutaway view of one implementation of the process vessel 18a. The process vessel 18a can include multiple levels, each of the levels can include at least one of a plurality of plates 22a. The plates 22a can be configured to direct materials through the process vessel 18a. The plates 22a can be made up of many different materials, for example and without limitation, stainless steel, aluminum, and carbon steel. In some implementations, the plates 22a can have a stiffness factor of about 5,000 lbf/in or greater. In other implementations, the materials can have other stiffness factor values. The process vessel 18a can include a heated plate 6a, a cooling plate 6b, a plurality of inlets 2a-2e used for conduits to introduce different process ingredients (including, without limitation, mixture constituents, coatings, reactants, and/or buffers) at different levels of the process vessel 18a, and an exit port 4 to discharge a product of the processing system 10a. The heating and cooling plates will be discussed in greater detail below, in reference to FIG. 21. The inlets 2a-2e can be positioned along the top and/or any side of the process vessel 18a to introduce materials. The exit port 4 can be positioned along a bottom portion of the process vessel 18a.

In some implementations, the process ingredients reacting and mixing in the process vessel 18a can form a fluidized bed inside the process vessel 18a. The processing system 10a is well suited to create fluidized beds, with material particle sizes that range from nano-sized particles to particles the size of tablets. Because the fluidization is formed by vibration, processing system 10a can fluidize nano-particles and all sizes up to tablets. The fluidized bed can be created at each level of the process vessel 18a.

FIG. 2 shows another illustrative example of a continuous processing system 10b. The processing system 10b includes a process vessel 18b, acoustic agitator 11b, electrical cabinet 12b, a hopper 8b, a support frame 9b, a drum 13b, and an output channel 26b. The processing system 10b is similar to processing system 10a, however, the hopper 8b is positioned on top of the support frame 9b, and the processing system 10b further includes the drum 13b to collect the product of the system 10b. The materials can be introduced to the process vessel 18b through the hopper 8b. The support frame 9b can be movably positioned over the process vessel 18b and acoustic agitator 11b instead of directly coupled to those components. This design can give the processing system 10b more versatility during operation as different hoppers 8b of materials can be moved into position without breaking down other parts of the system 10b. In some implementations, the support frame 9b can include wheels to allow for greater mobility. Once the materials have been processed and passed through the process vessel 18b, they can be discharged via the outlet channel 26b and into the drum 13b. The drum 13b can be any kind of container for holding or storing material. The outlet channel 26b can be any kind of tube, pipe or conduit for transferring materials from the process vessel 18b to the drum 13b.

FIG. 3 shows another example of a processing system 10c. More particularly, FIG. 3 shows an expanded view of the processing system 10c used for the coating of a sample active pharmaceutical ingredients (API). The processing system 10c includes a process vessel 18c, an acoustic agitator 11c, a feed line 132 from a tank 128 holding the materials to be processed. The tank 128 is coupled to a cabinet 130 to provide controls for the tank 128. The processing system 10c further includes a hood 134 in which the acoustic agitation 11c, the process vessel 18c and a sprayer 44c are housed. In some implementations, the hood 134 is mounted on the acoustic agitation 11 and only encloses the sprayer 44c and process vessel 18c. The hood 134 traps and/or prevents any free gasses introduced into or emitted from the process vessel 18c from polluting an external environment. The sprayer 44c is configured to introduce fluid from the tank 128 directly into the process vessel 18c. Additionally, FIG. 3 shows a vacuum feed 138 coupled to the process vessel 18c, providing for any reactions occurring within the process vessel 18c to occur under a reduced pressure, or in some cases a partial, or a full vacuum.

Figure 4:
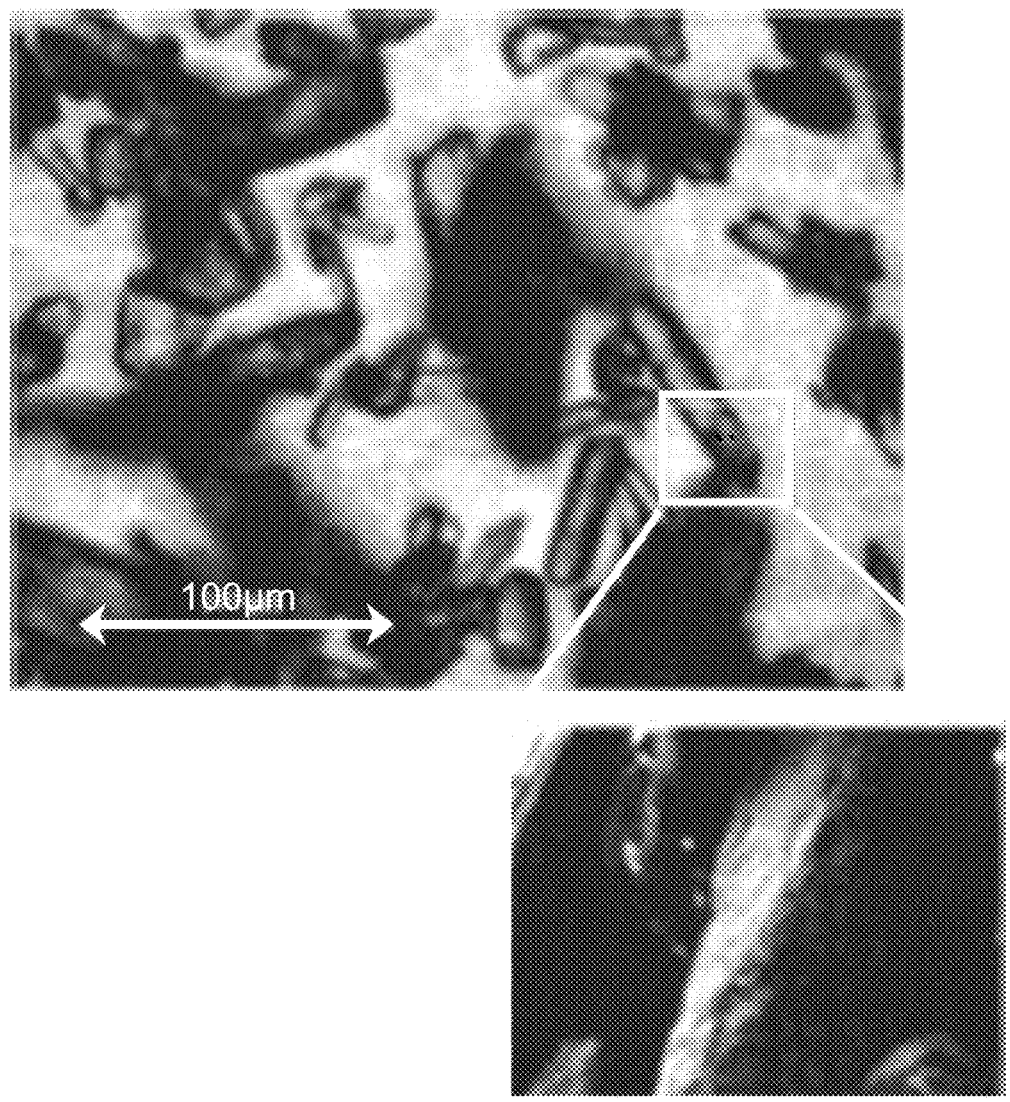
FIG. 4 is a picture of an uncoated API material coated by traditional techniques.
Figure 5:
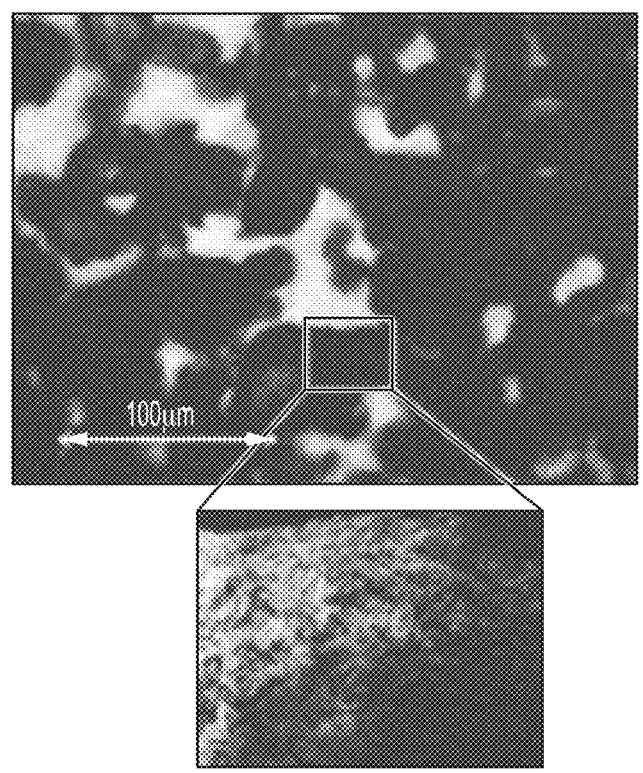
FIG. 5 is a picture of a coated API material coated by the continuous processing system.

In one experiment using the processing system 10c, a sample API material (ibuprofen) was coated with a polymer (Ibuprofen 70, BASF Corporation, Bishop Tex.). A picture of API material coated by a traditional spray drying system is displayed in FIG. 4, with an optical microscope picture and a SEM image in the lower right. The traditional spray drying system coated the API material around the diameter, but the ends were left uncoated and agglomerations of many particles were formed. By using the processing system 10c shown in FIG. 3, the ibuprofen crystals were coated with the polymer and the ends were also coated. The coated particles also did not agglomerate. A picture of the coated ibuprofen using an optical microscope is displayed in FIG. 5 and an SEM image is displayed in the lower right.

Implementations of the Process Vessel

FIGS. 6-16 show cutaway views of different examples of a process vessel 18 suitable for use in a continuous processing system 10. The process vessel 18 can be configured in different shapes and sizes and can include many different components based upon the products being mixed, combined, dried, coated, segregated, and/or reacted and the desired end product.

Figure 6:
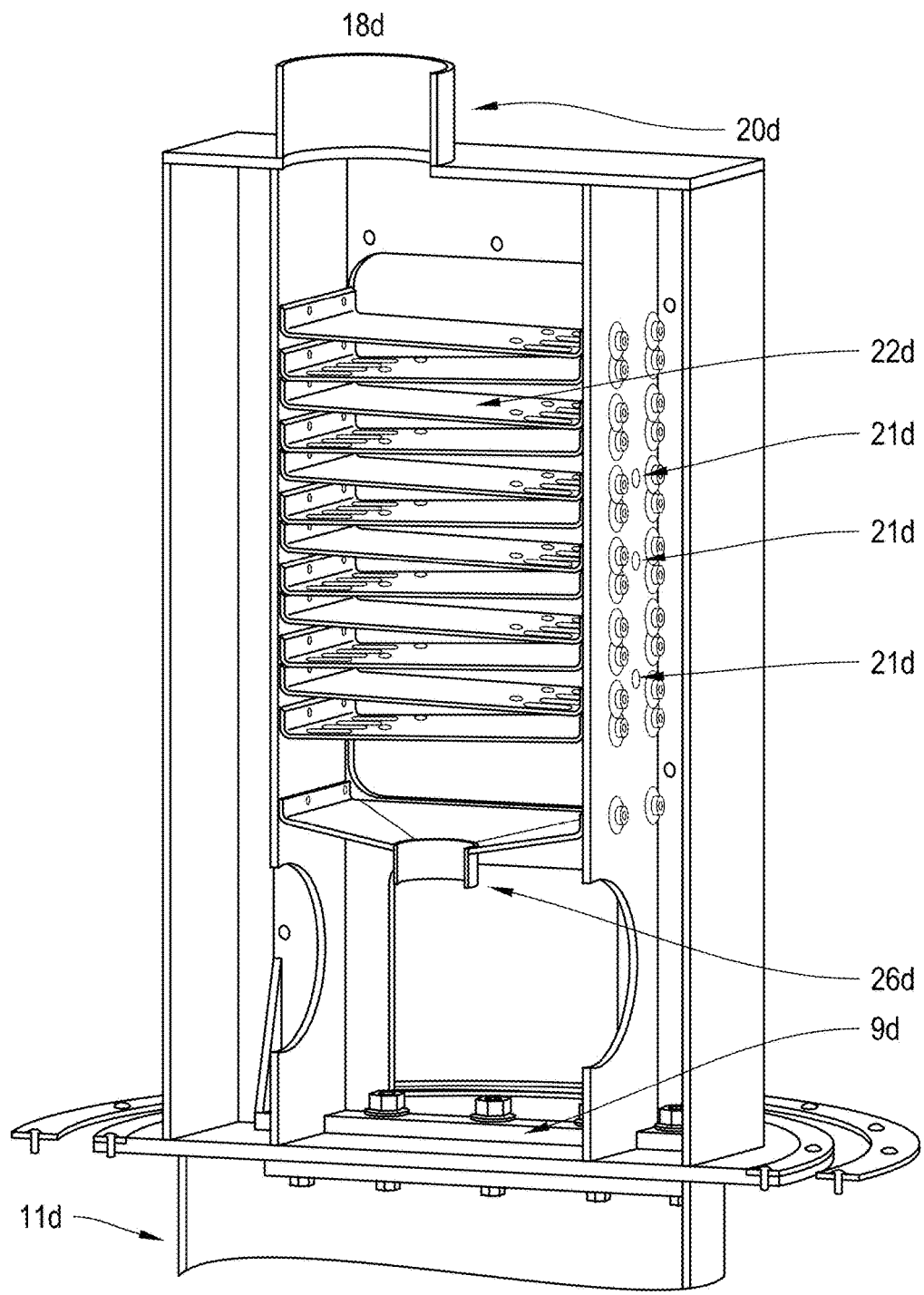
FIGS. 6-12 are cutaway perspective views of various example implementations of a continuous process vessel.

FIG. 6 shows an example process vessel 18d. The process vessel 18d includes an inlet port 20d, material addition ports 21d, a plurality of plates 22d, an outlet port 26d and a base adapter 9d for coupling the process vessel 18d to an acoustic agitator 11d. In various implementations, the process vessel 18d has a capacity ranging from about 0.5 L to 200 L. The process vessel 18d implementation shown in FIG. 6 includes a cascading plate arrangement whereby fluid and gas enter at the top of the process vessel 18d through the inlet 20d and descend over the plates 22d before the results and/or product exits at the bottom through the outlet port 26d.

The process vessel 18d is configured to have a modular plate design. That is each plate 22d is removably secured to the walls of the process vessel 18d at attachment points formed in the walls. Accordingly, when configuring the process vessel 18d for a particular process a system operator can install plates with desired characteristics and features at desired locations within the process vessel 18d. The plate characteristics can include the angle of the plate 22d with regards to the wall, the size of one or more orifices 23 formed through the plate 22d, various surface coatings, etc. The modularity also allows the process vessel 18d to be configured with different sized gaps between plates 22d. Each of the plates 22d can be separated by different gap sizes to create different processing stages in the process vessel 18d. The process vessel 18d can be configured such that all of the plates 22d have the same plate angle. In other configurations, at least two of the plates 22d have different plates angles. The angled plate design can be configured to allow the materials to spend more time at one level (one stage of the process) as opposed to at another level in the process vessel 18d. The greater the angle of the plates 22d in a given level, the faster the materials move through the respective level. With a smaller plate angle, the materials can move slower and spend more time at a level of the process vessel 18d. The angles of the plates 22d can be configured to optimize reaction and/or mixing performance, uniformity and yield, as well as mitigate the formation of undesirable side products, or poorly mixed products.

In the process vessel 18d, reacting can occur uniformly at any position on any plate 22f, or at any of the positions between two plates 22d. This uniformity allows the system to be scaled in accordance with surface contact area between the plates 22d and the materials being processed. One can thus provide added processing time (contact time) by either increasing the surface area of each plate 22f, or increasing the number of plates 22d, or a combination thereof in the process vessel 18d.

For a broad range of materials to be processed, spacing between the plates 22d is important to efficient mixing. A primary purpose of keeping the spacing correctly adjusted, in some implementations, is to ensure that the materials being processed are aggressively contacted by both the top and bottom plates 22d of the respective levels the materials are at in the process vessel 18d. That is, if the plate to plate spacing of the plates 22d is configured so that the process ingredients impact both the top and bottom plate 22d of the current level they are at, enhanced processing can be achieved for different types of materials.

Each surface of the plates 22d can act as a transducer to impart acceleration into the materials being processed. The acceleration forces can range from a few g's of acceleration to more than 200 g of acceleration. The spacing is thus also correlated to the combined acceleration level and displacement of the plates 22d. It has been observed that higher combined acceleration forces and higher displacements allow greater spacing, which can also provide greater throughput for the process vessel 18d.

The particle to particle interaction can contribute to micro-mixing that induces diffusion like phenomena and integration of the particles. The diffusion like phenomena is the side to side and up and down movement of the particles. The particle to particle collisions occur at high rates and high accelerations, resulting in the fluidization of the materials. Micro-mixing, as well as the bulk mixing allows for new materials to be added to this chaotic mixture of materials at various levels of process vessel 18d.

In this process vessel 18d design, the same acoustic agitator 11 can be used to agitate different process vessels 18. To accommodate different designs, the base adapter 9d can removable couple different process vessels 18, of various types and sizes, to the acoustic agitator 11. In some implementations, the base adapter 9d can removable couple the process vessel 18 to the acoustic agitator using a fastener 36. The fastener 36, as will be discussed in greater detail with regards to FIG. 7, can securely, but reversibly couple different components of the processing system 10 together. The fasteners 36 can be any type of hardware that securely mechanically joins or affixes two or more objects together, including for example, a nut, bolt, clamp, or threaded fastener. The base adapter 9d and the fastener 36 allow an operator to configure a processing system 10 to his or her specific needs by allowing the operator to select and couple an appropriate process vessel 18 to the acoustic agitator 11 to form a custom processing system 10. The appropriate reaction vessel 18 can depend on the type of process to be supported, for example mixing, combining, drying, coating, segregating, and/or reacting materials. This provides for diverse applications, which lowers the space and amount of large equipment used in a multi-purpose facility.

In addition to different plate configurations, the surface of the plates 22d can be configured in various ways to accommodate different types of materials to be processed in the process vessel 18d. One implementation is to configure the plates 22d with orifices 23, as will be discussed in regards to FIGS. 13a and 13b below, to allow the materials to flow from one level to the next in the process vessel 18d. The orifice sizes can range from a few tenths of an inch to several inches. As the materials move in a random fashion along each plate 22d, they are directed toward the orifices 23 by the process vessel 18d shape and design. In some implementations, the orifice 23 can be positioned at the end of a plate 22d. The angle of the plates 22d directs the materials towards the orifice 23. The rate of movement to and through an orifice 23 of a plate 22d at a level of the process vessel 18d is dependent upon, for example, the angle of the plates 22d with regards to a wall of the process vessel 8d, the number of plates 22d in the process vessel 18d, the size of one or more orifices 23 formed through the plate 22d, the number of orifices 23 formed through the plate 22d and the placement of the orifices 23 on the plate 22d. Some applications, the greater the angle of the plate 22d toward the orifice 23, as well as the larger the orifice 23, the faster the materials can flow through the process vessel 18d.

The residence time of a set of process ingredients at a level within the process vessel 18d is defined as the time that the materials flowing through the process vessel 18d are in contact with the plates 22d of that level. The residence time is dependent upon the materials properties, the plate 22d design, the orifice 23 design and the acoustic agitator 11a operating conditions specified above. Factors that can be adjusted to change the residence times include plate slope angle, number of plates 22d, orifice size, number of orifices 23 and orifice placement on the plates 22d.

Figure 7:
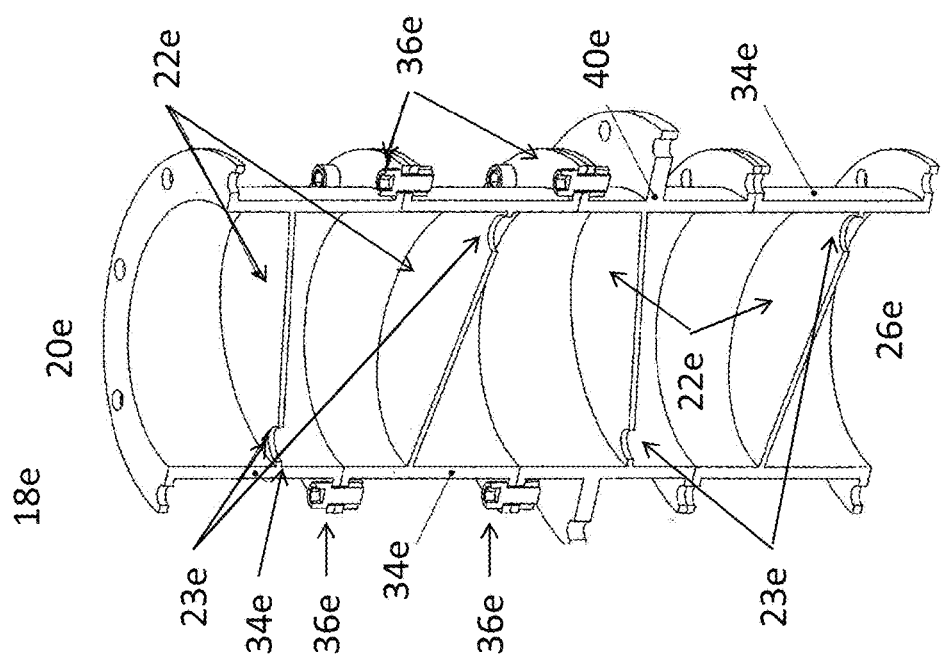

FIG. 7 shows an example expandable process vessel 18e. Process vessel 18e includes multiples levels. Each level is formed by a vessel section 34e. Each vessel section 34e includes at least one plate 22e having one or more orifices 23e at an end. One lower vessel section 34e serves as a vessel base having an outlet 26e, while one upper vessel section 34e includes a process ingredient inlet 20e. The process vessel 18e can be configured to cause at least one process ingredient, when introduced through the inlet 20e, to be subjected to flow through each vessel section 34e, over the plates 22e. The process ingredients can transition from one level to the next level of the process vessel 18e through the orifices 23e of each of the plates 22e. The number of vessel sections 34e and plates 22e in the process vessel 18e can range from two to several hundred.

The plates 22e are capable of transferring acoustic energy generated by an acoustic agitator, such as the acoustic agitator 11a in FIG. 1, into the process ingredients passing through the process vessel 18e. The multiples levels can be created by using fasteners 36e to securely, but reversibly couple multiple vessel sections 34e together, to create a desired size continuous process vessel 18e. The fasteners 36e can be any type of hardware that securely mechanically joins or affixes two or more objects together, including for example, a nut, bolt, clamp, or threaded fastener. In some implementations, the fasteners 36e can be configured for removably coupling the continuous process vessel 18e to an acoustic agitator, such as the acoustic agitator 11a shown in FIG. 1. The fasteners 36 can join the vessel base 40e of the process vessel 18d to the acoustic agitator 11. The vessel base 40e can include the outlet 26e for discharging a product of the process vessel 18e. The process vessel 18e allows an operator to configure a processing system 10 to his or her specific needs by allowing the operator to select and couple an appropriate set of vessel sections 34e together to form a custom process vessel 18e.

Figure 8:
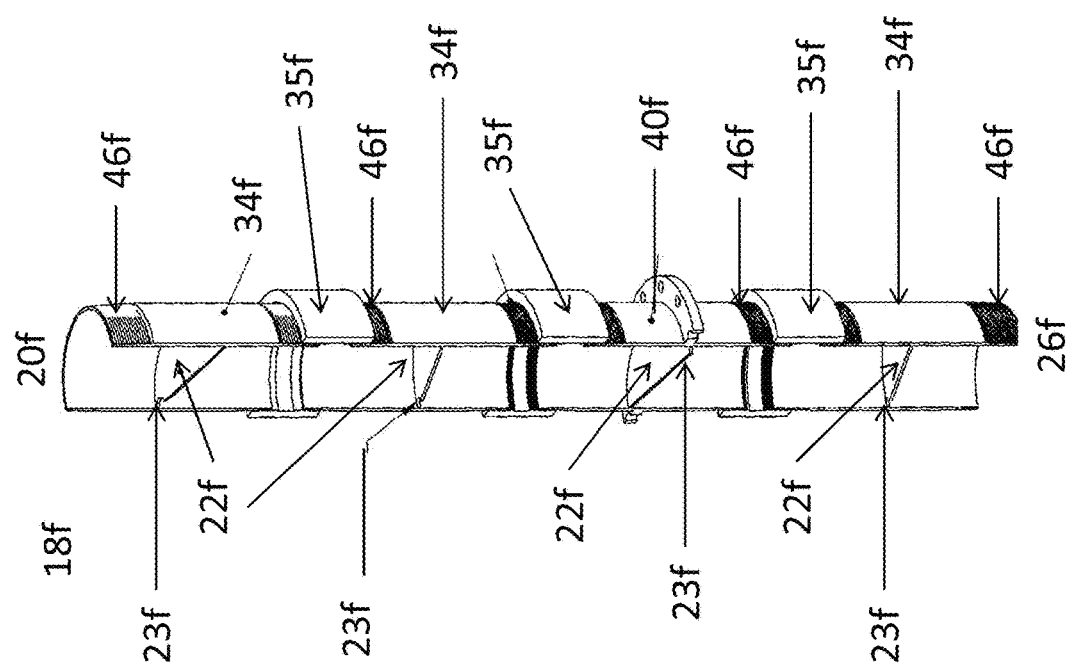

FIG. 8 shows another example process vessel 18f. The process vessel 18f is substantially similar to the process vessel 18f shown in FIG. 7. However instead of having vessel sections 34e being coupled by support fasteners 36e, the process vessel 18f is formed from vessel sections 34f which integrate fasteners directly into their structure, specifically the ends of vessel section 34f are threaded. As shown in FIG. 8, in some implementations, both ends of each vessel section 34f are threaded, and vessel sections 34e are coupled by "screwing" the ends of adjacent vessel sections 34f into a threaded joint 35. In other implementations, the vessel sections 34f have a threaded "male" end and an opposite threaded "female" end, such that adjacent vessel sections 34f can be directly screwed into one another.

Figure 9:
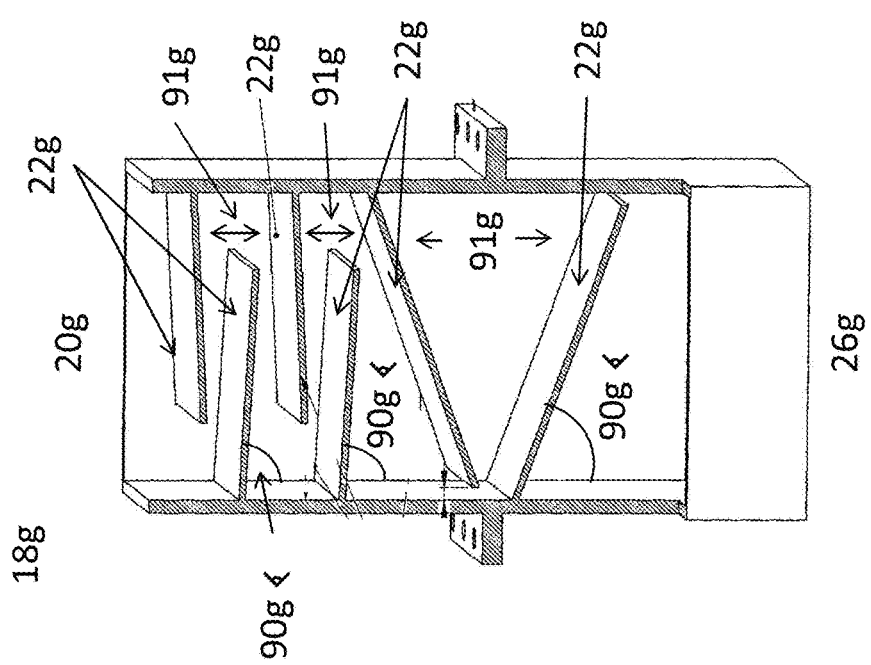

FIG. 9 shows another example process vessels 18g. The process vessel 18g includes an inlet 20g, multiple plates 22g, and an outlet 26g. The process vessel 18g is similar to process vessel 18d, but the plates 22g are configured with varying plate angles 90g and different gap sizes 91g between at least two of the plates 22g. The plate angles 90g of the plates 22g can range from 1 degree to 75 degrees. The process vessel 18f can include different gap sizes 91g between different pairs of plates 22g. The gap size 91g and the plate angles 90g in the process vessel 18h can be configured to allow the materials to accumulate at different levels or specific mix locations. In some implementation, the gap size 91g and the plate angle 90g can be configured to allow the materials to accumulate at the bottom of the continuous process vessel 18g.

As shown, the plate angles 90g of the plates 22g increase from the top of the vessel to the bottom of the process vessel 18g. The increasing plate angles, in the same implementations, helps provide a constant flow rate of introduced process ingredients, as the viscosity of the process ingredients and products increases as a result of the induced process. In other implementations, the increase plate angles 90g serve to increase the flow rate of process ingredients as a reaction progresses.

Figure 10:
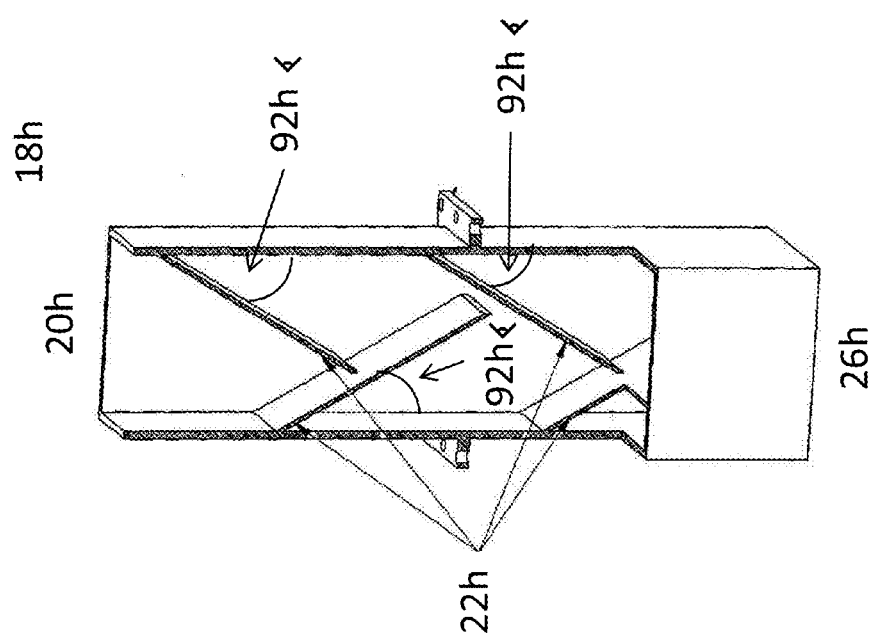

FIG. 10 shows another example process vessel 18h. The process vessel 18h can include an inlet 20h, multiple plates 22h and an outlet 26h. The process vessel 18h is similar to process vessel 18f shown in FIG. 8, but the process vessel 18g includes plates 22g configured with steep but constant plate angles 92h. Process ingredients can be introduced into the process vessel 18h through the inlet 20h and interact with the plates 22h. The steep plate angles 92h can provide more wall area for reacting or processing pastes, slurries and other viscous materials. The process vessel 18h, as with any of the process vessel's 18 described herein, can accommodate different arrangements of the plates 22h, dependent upon the types of materials to be processed, as shown in FIGS. 9, and 10, as well as in FIGS. 11 and 12 discussed below.

Figure 11:
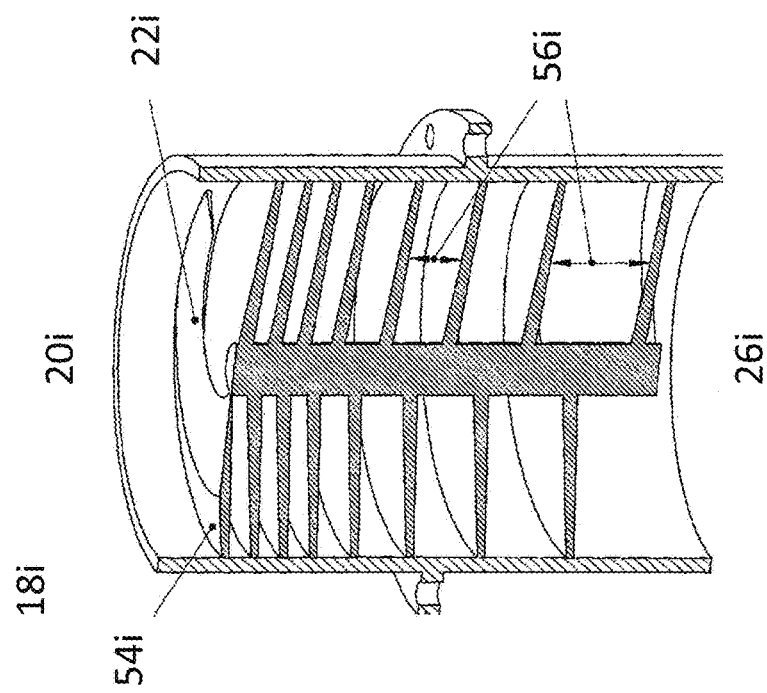

FIG. 11 shows another example process vessel 18i. The process vessel 18i includes an inlet 20i, a helical plate 22i, and an outlet 26i. The helical plate 22i of process vessel 18i can be configured to include a continuous inclined plane 54i. The plate 22i can further be configured to include variable spacing 56i between at least two levels of the plate 22i. The plate 22i can also be configured with a varying pitch angles at different positions with the process vessel 18i. The continuous inclined plane 54i can be configured in the process vessel 18i to create a helix formation. Instead of passing from one level to the next through an orifice 23, as shown in FIG. 6, the materials introduced to the process vessel 18i through the inlet 20i can spiral down the process vessel 18i and through the different levels along the single helical plate 22i. When the materials reach the bottom of the process vessel 18i and have been substantially processed, reacted, and/or mixed, they can be discharged through the output 26i. Further, the spacing of the different levels of the helix configuration can be different due to the variable spacing referred above. The variable spacing can create different processing stages within the process vessel 18i and accommodate different process parameters for a variety of applications, for example mixing, combining, drying, coating, segregating, and/or reacting applications.

Figure 12:
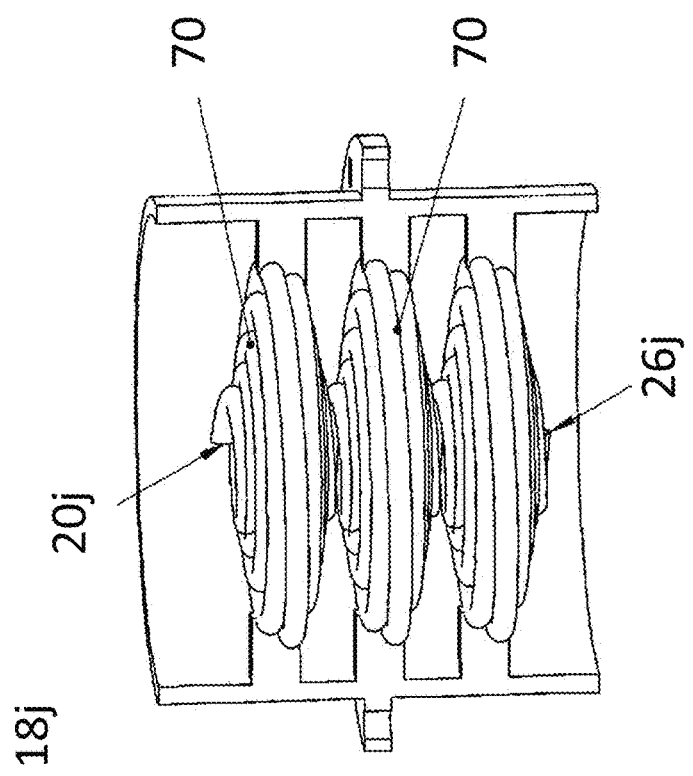

In still another example implementation of a different plate arrangement, FIG. 12 shows an example process vessel 18j. Instead of the process vessel 18j being configured with plates 22g, as shown in FIGS. 6-11, the process vessel 18j includes coiled pipes 70 for processing the materials. The process vessel 18j includes an inlet 20j, the coiled pipes 70 and an outlet 26j. Materials can be introduced to the process vessel 18j through the inlet 20i and pass through the process vessel 18j through the coiled pipes 70. The coiled pipes can be configured in a helix or spiral formation inside the process vessel 18*i*. In some implementations, the process vessel 18*i* can include compact coiled pipes to save space and maximize length of the reaction, and/or mixing process. The compact coiled pipes can allow for more coiled pipe length in the process vessel 18*j* to allow the materials to be in process longer. Once the materials have been substantially reacted, they can be discharged through the outlet 26*j*.

Figure 13A:
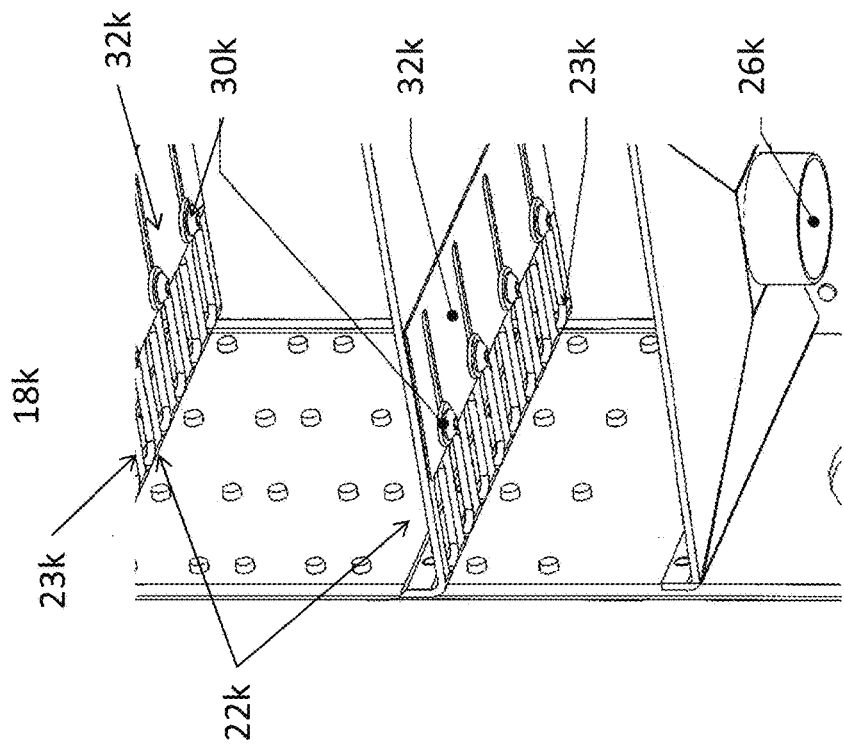
FIGS. 13*a*-13*b* are perspective views of adjustable orifice designs.
Figure 13B:
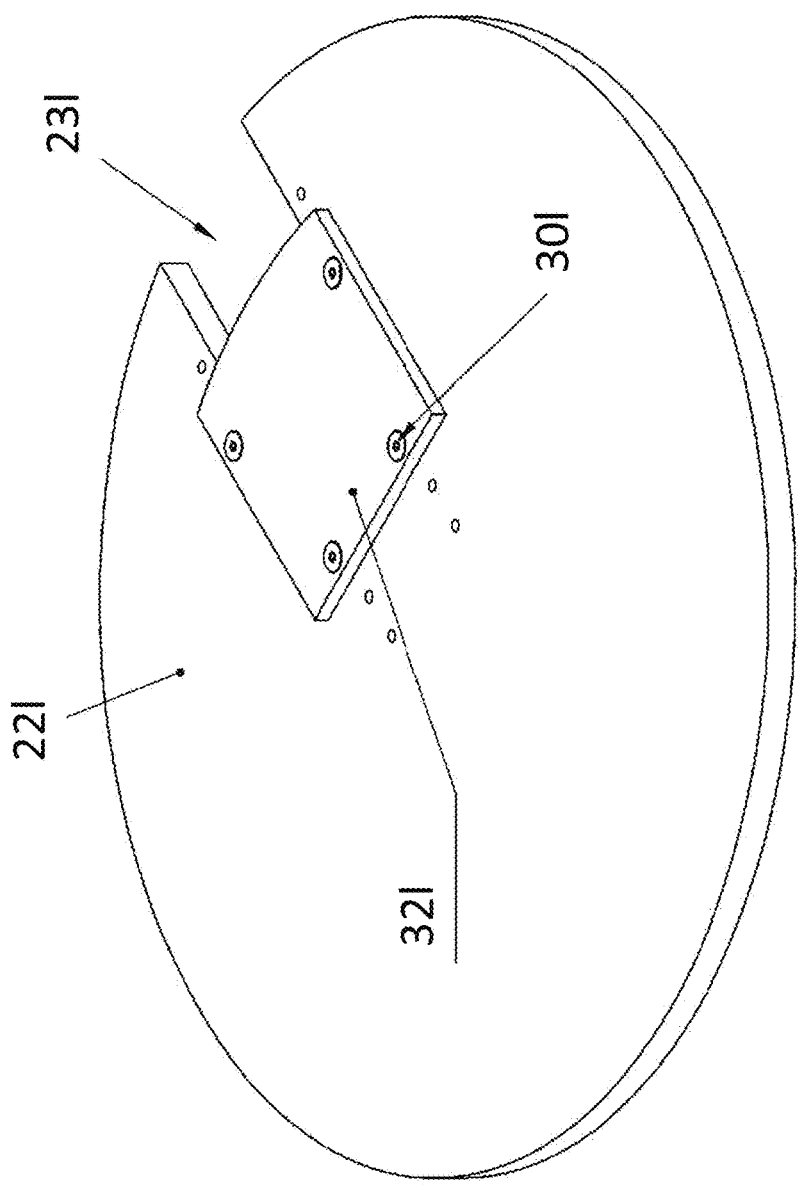

FIGS. 13*a* and 13*b* show examples of two adjustable orifice designs. As described above, in many implementations, the plates 22 included in the process vessel 18 include orifices 23 at one end. In order to increase the configurability of the process vessels 18, in some implementations, the orifices are configured to be adjustable.

In FIG. 13A, a process vessel 18 includes multiple plates 22*k*, sets of adjustable orifices 23*k* and an outlet 26*k*. The plates 22*k* can be configured with the adjustable orifices 23*k* to allow materials to move from one level of the process vessel 18 to the next level at a configurable rate until the materials reach the outlet 26*k* and are discharged. Each of the plates 22*k* in the process vessel 18 can have at least one adjustable orifice 23*k*. In some implementations, the plates 22*k* can have multiple adjustable orifices 23*k*. The plates 22*k* can include an adjustable orifice plate 32*k* and an orifice plate lock 30*k*. The orifice plate lock 30*k* mechanically secures the adjustable orifice plate 32*k* to the plates 22*k* to create the adjustable orifices 23*k*. The sizes of the adjustable orifices 23*k* can be configured by changing the positions and placement of the adjustable plate 32. The adjustable orifice 23*k* can be configured before operation of the process vessel 18, depending on the types of materials to be reacted and/or mixed. The adjustable orifice 23*k* on the plate 22*k* at one level can be a different size from the adjustable orifice 23*k* on the plate 22*k* at a different level in the process vessel 18.

FIG. 13B shows another example adjustable orifice 23*l*. The adjustable orifice 23*l* is similar to the adjustable orifice 23*k*, shown in FIG. 13*a*. The adjustable orifice 23*l* includes an orifice plate 22*l*, an adjustable orifice plate 32*l*, and an orifice plate lock 30*l*. The orifice plate lock 30*l* can mechanically secure the adjustable orifice plate 32*l* to the plate 22*l*. The size of the adjustable orifice 23*l* can be configured to be a few tenths of an inch to several inches. The size of the adjustable orifice 23*l* can be adjusted based on the desired flow speed of the materials through the process vessel 18.

In some implementations, the orifice plate 32*l* can be coupled to an actuator, instead of to an orifice plate lock 30*l*. In such implementations, the size of the orifice 23*l* can be adjusted during operation of the continuous processing system 10. For example, during initial start-up, the adjustable orifices 23*l* throughout a portion of the entirety of the process vessel 18*l* can be closed so that each level of process vessel 18 can fully charge before opening access to the next level. After each level of the process vessel has been fully charged, the adjustable orifice 23*l* can be opened to an appropriate size to allow the materials to pass through the process vessel 18. In this fashion, the materials to exit the process vessel 18 substantially reacted and/or mixed.

FIG. 14 depicts another example process vessel 18*m*. The process vessel 18*m* includes an inlet 20*m*, five outlets 74*a*-74*e*, and multiple plates 22*m*. The surface of the plates 22*m* can each have a plurality of openings 73 to serve as a sieve. In some other implementations, the surface of the plates 22*m* can be configured to have a mesh construction.

Materials can be introduced into process vessel 18*m* through the inlet 20*m* and come into contact with the plates 22*m*. The openings 73 on the surface on the surface of the plates 22*m* can separate the materials and allow only smaller materials to pass through to the next level in the process vessel 18*m*. The openings 73 on the surface of at least two plates 22*m* can be of a different size. In some implementations, the size of the openings 73 can decease at each lower level of the process vessel 18*m*. The first outlet 74*a* of the process vessel 18*m* can be formed through the outer wall of the process vessel 18*m*. The first outlet size A 74*a* can be configured to allow for extraction of the materials of a first largest size. The second through fifth outlets 74*b*-74*e* can be configured and operate in a similar fashion as the first outlet size A 74*a*, but can be formed at the outer wall of different levels of the process vessel 18*m* to extract increasingly fine particles from the process vessel 18*m*. The outlet sizes 74*a*-74*e* can allow materials to be extracted at different stages of the process. In some implementations, each level of the process vessel 18*m* can be configured with the an outlet 74 to extract materials. In other implementations, only select levels of the process vessel 18*m* can be configured with an outlet 74. In some implementations, outlets 74 at one or more levels of the process vessel 18*m* can be a different size.

Figure 15:
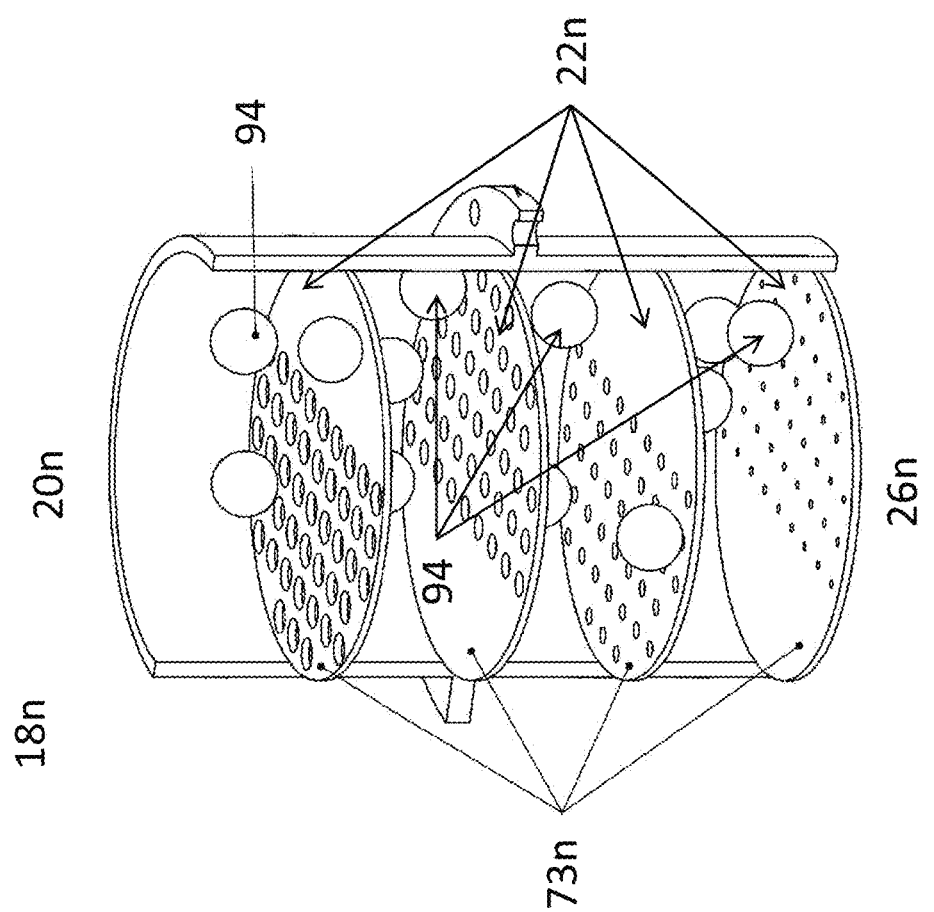

FIG. 15 shows another example process vessel 18*n*. The process vessel 18*n* is similar to process vessel 18*a*, however the process vessel 18*n* further includes a grinding media 94 disposed within at least some of the levels of the process vessel 18*n*. The process vessel 18*n* includes an inlet 20*n*, an outlet 26*n*, a plurality of plates 22*n*, and the grinding media 94. The plates 22*n* can include a plurality of openings 73*n*. The grinding media 94 can be placed between at least two of the plates 22*n*. The grinding media 94 can be made of various materials, including but not limited to, metals or ceramics, and shapes (including, but not limited to, spheres or cylinders). The process ingredients can be introduced to the process vessel 18*n* through the inlet 20*n*. In the process vessel 18*n*, the materials can collide with the grinding media 94 disposed between the plates 22*n* or get trapped between the grinding media 94 and the plates 22*n* and as a result be crushed into smaller sizes. As shown, the grinding media 94 can be included in the sieve configuration described in FIG. 14. In other implementations, the grinding media 94 can be included in the plate configuration shown in FIG. 6. The amount of grinding media 94 disposed between the plates 22*n* can vary from little to as much as can fit between the plates 22*n* in the process vessel 18*n*. The amount of grinding media 94 can depend on the desired product of the materials to be reacted. A lesser amount of grinding media 94 can provide minor processing or milling of the materials. A larger amount of grinding media 94, packed between the plates 22*n*, can provide a greater amount of processing or milling of the materials.

The grinding media 94 can also be used to help prevent bridging of mixing powder materials as well as to break off materials that can adhere to the walls of the process vessel 18 during operation. For applications in which different grinding media 94 for different materials or process ingredients is required, or if the media 94 has to be cleaned, the following methods can be applied. A magnetic grinding media 94 can be added to the process vessel 18*n* and then collected with a strong magnet at the outlet 26*n*. This separates the grinding media 94 from the end product of a reaction. The collected grinding media 94 can then be recycled and added with future incoming material. Another method is to have a removable door on the bottom of the process vessel 18*n* to allow the grinding media 94 to be removed to clean and/or change it out.

Figure 16:
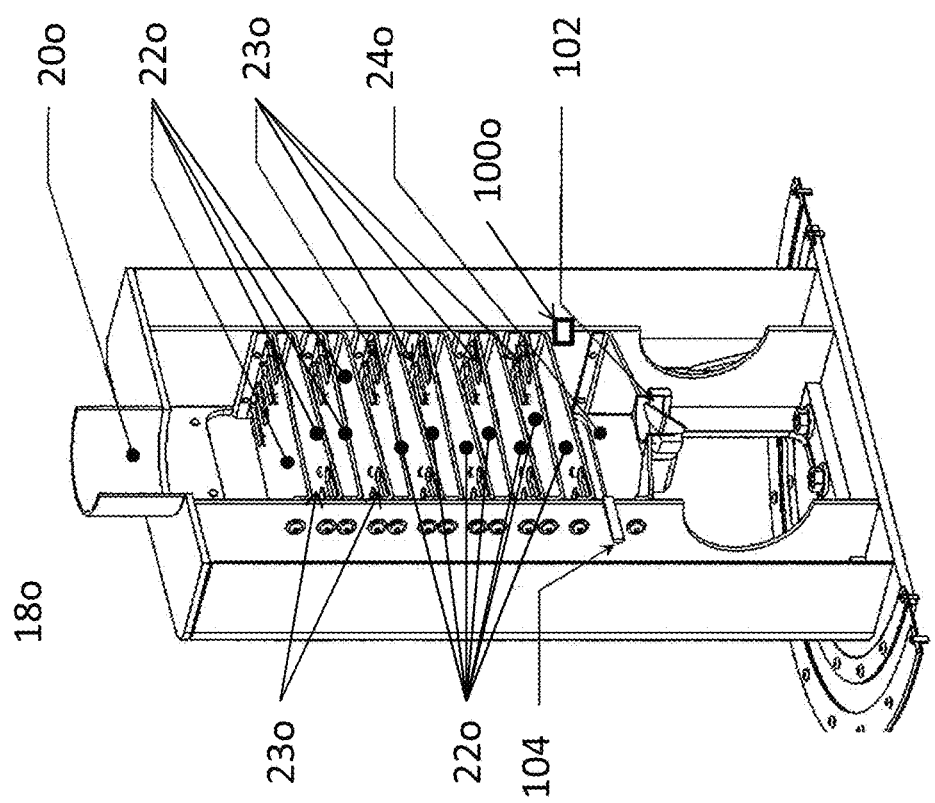

FIG. 16 shows an example process vessel 180. The process vessel 18*o* includes an inlet 20*o*, a plurality of plates 22*o*, a vent 100*o*, an outlet chamber 24*o*, an outlet valve 102, and a level sensor 104. The process vessel 18o is similar to process vessel 18a, but further includes the vent 100o, the outlet valve 102, and the level sensor 104.

Materials can be introduced into the process vessel 18o through the inlet 20o and can come into contact with the plates 22o. The materials can move from one level to the next level in the process vessel 18o through orifices 23o formed through each plate. In some applications, such as reacting materials being mixed that produce dust, the operation requires some head, or free space between the plates 22o. The free space is needed to allow the materials to interact/collide with one another and not be tightly packed. Without the free movement allowed by the free space between the particles, the particles cannot freely collide and randomly mix in the process vessel 18O. However, if one or more of the materials being mixed "dusts" and becomes entrained in the air, or in gas within the process vessel 18o, it can undesirably be carried out through the outlet valve 102 at the bottom of process vessel 18O. To prevent such occurrences, the bottom of the process vessel 18o, can include the vent 100o formed through its outer wall. In other implementations, the vent 100o can be positioned along any portion of the process vessel 18O. The vent 100o can be configured to allow air or gas to exit the outlet chamber 24o so that the materials can pass freely throughout the process vessel 18o without becoming entrained in the air or in the gas. In some implementations, the vent 100o can be configured with a filter to prevent the processing materials from exiting, as shown in FIG. 16, allowing only air or gas to pass out of the process vessel 18o, but retaining materials inside the outlet chamber 24o. By retaining the materials inside the outlet chamber 24o, the desired mixture concentrations can be maintained. Complete entrainment of materials in mixes are especially important for products that have small amounts of certain constituents that must be thoroughly and uniformly distributed throughout the product, such as an active drug material in the manufacture of pharmaceuticals.

The outlet chamber 24o can be configured to allow the materials or the product of the process vessel 18o to accumulate prior to being discharged through the outlet valve 102. In some implementations, the outlet chamber 24o can be configured to restrict the materials or product from discharging through the outlet valve 102, causing a build up of materials, so only solid particles can discharge through the outlet valve 102. The outlet chamber 24o can be configured to collect the materials or product at the bottom of the process vessel 18o during operation. The outlet chamber 24o can collect the materials or product in order to prevent the them from demixing as they exit the process vessel 18O.

The process vessel 18o can be configured with the level sensor 104 for controlling the outlet valve 102. The level sensor 104 can be configured to keep the outlet valve 102 closed until a sufficient amount of the end product of the reaction has collected, i.e. the material, has reached the level of the sensor. This limits the amount of time the outlet valve 102 is open, helps maintain the process ingredients in the process vessel 18O.

The outlet valve 102 can positioned along the bottom of the process vessel 18o for discharging a product of the materials subsequent to the materials passing through at least a portion of the process vessel 18o while being exposed to the acoustic energy transferred by the plates 22o.

Introducing Materials into the Continuous Processing System

The processing system 10 can process a variety of different materials in a variety of different applications. To allow for this, different techniques and methods for introducing the materials into the process vessel 18 can be used. One challenge in processing materials in a continuous process is to have a uniform product. To do so, care must be taken to feed the process ingredients into the process vessel uniformly. One way to provide for increased uniformity in process ingredient introduction is to introduce a process ingredient via a spray nozzle.

Figure 17:
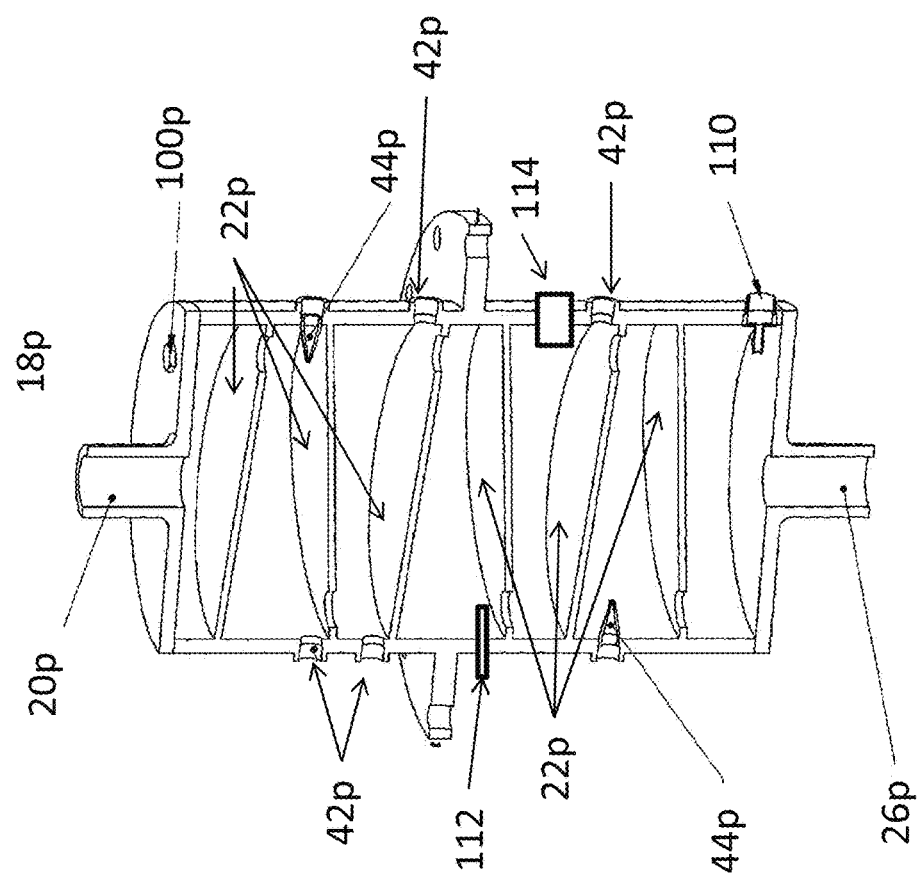
FIGS. 17-20 are cutaway perspective views of various example implementations of a continuous process vessel configured with a sprayer.

FIG. 17 shows an example process vessel 18p that includes spray nozzles for introducing process ingredients. The process vessel 18p includes an inlet 20p, a plurality of plates 22p, a vent 100p, two sprayers 44p, an injection/extraction port 42p, a sweep gas port 110, a temperature sensor 112, a near infrared (NIR) sensor 114, and an outlet 26p. Materials can be introduced into the process vessel 18p through the inlet 20p, similar to the process vessel 18d as was described in reference to FIG. 6 above. The inlet 20p can be positioned in the top of the process vessel 18p. Additional process ingredients, or coating material and/or buffers can be introduced through the spray nozzles 44p or through the injection/extraction port 42p. In some implementations, the inlet 20p itself can be a spray nozzle.

The sprayers 44p can introduce or inject materials into the process vessel 20p, similar to the inlet 20p, but from different angles and at different levels of the process vessel 18p. For example, in coating applications, coatings can be applied to materials introduced through the inlet 20p by adding the sprayers 44p. The angle of the plates 22p can be adjusted to accommodate the flow-through needs of the materials to be coated and the time needed for thorough coating to be accomplished. In addition, the number of plates 22p can be adjusted to provide adequate coating durations, but not so long as to continue to agitate the materials after they have been coated to the point of causing the coatings to be removed.

In some implementations, as shown in FIG. 17, multiple sprayers 44p can be coupled to the process vessel 18p. The sprayers 44p can be positioned along any portion of the process vessel 18p. In some applications, it can be necessary to add more materials later in the process. In other applications, later introduction of materials can be advantageous because some materials may not need to be coated with all of the coatings introduced into process vessel 18p and doing so allows for various materials to be added after an earlier coating stage in the process vessel 18p occurring at a higher level.

The flow rate, nozzle type, number of nozzles, location of sprayer (s) 44p, intensity of mixing, as well as many other system and material properties affect the mixture and the mixing outcome. For example, if the fluid addition flow rate is too great then there is a high likely hood that clumps will form. To mitigate this problem, more nozzles can be added and separated downstream in the process vessel 18p. The nozzle of the sprayer 44p can be of various types including, for example and without limitation, a cone, ring, and a straight jet nozzle. The different types of sprayers 44p can cause different flow patterns, for example a flat flow pattern or a straight jet flow pattern. The particle sizes produced by the sprayer 44p can range from nano-sized to rain drop sized. Industry standard atomizers or sprayers 44p including pressure atomizers (plain orifice, pressure-swirl, square spray, duplex, spill return, and fan spray), rotary atomizers, air-assist atomizers, air blast atomizers, electrostatic, and ultrasonic, sonic, windmill, vibrating capillary, flashing liquid jets, effervescent and piezoelectric atomizers can be used with the process vessel 18p. The type of nozzle as well as the fluid parameters of density, viscosity, and surface tension can play a large role in the size of fluid particles being sprayed from the sprayer 44p. In some implementations, the sprayer 44p can spray a fluid, powder, or any combination thereof. Because the processing system 10 does not use pneumatics to create a fluidized bed, the process vessel 18p holding the fluidized bed can be closed, which allows for small powders, such as nano-materials to be sprayed into the fluidized bed without having the fluidization gasses trying to pull them out of the fluidized bed. In some implementations, the sprayer 44p can be configured to spray liquid droplets to coat particles as well as for adding sprayed liquid droplets to incorporate liquids into the process vessel 18p.

In other applications using the process vessel 18p, such as spray misting applications, finely dispersed liquids are sprayed onto solids (powders) to make a paste. When attempting to coat and/or mix liquids and solids together, problems can arise, if all the ingredients are added into the process vessel 18p at one time. The solids can become coated by the liquid and stay in unmixed dry clumps. The dry clumps can be broken up by applying enough shear, but some powders are very shear sensitive and if these clumps form, then the particles will break during the breakage of the clumps. Through diffusion, liquid can permeate into the dry clumps over time, which typically makes the clumps much harder and more difficult to break up. When wetted hard clumps are formed using shear sensitive powders, damage will occur if these clumps are broken up after they are formed. Therefore, when using shear sensitive materials, it is critical to not form clumps when mixing. Using the process vessel 18p configured with sprayers 44p, one can add the powders slowly while the liquid is while traveling in the process vessel 18p and allow the powder to go into the liquid without forming clumps.

In baking, if all liquids are added to solids (powders) and then mixed, the end result will likely have clumps of dry powder or highly viscous regions. By using the process vessel 18p configured with sprayers 44p to add the liquids continuously at different levels or in pulsed additions while the solids and liquids combine, the clumps and highly viscous regions can be prevented from forming. In addition to the applications described above, the process vessel 18p configured with sprayers 44p can be used in many other applications.

The process vessel 18p configured with the sprayer 44p can be used for spray coating of powders onto a powder, such as in the polymer industry where polymer materials are alloyed. The materials that are alloyed must all be fed into a polymer extruder at a constant material constituent rate or else the polymer material will vary in material and mechanical properties. Many of the alloying materials are of small amounts and can have a small particle size. The process vessel 18p can be used to coat the smaller amounts of alloying materials onto the parent material with the use of sprayers 44p spraying onto the fluidized bed of parent material inside the process vessel 18p. This allows the correct amount of material to be fed into the extruder to compound the alloying material. The process vessel 18p can also be applied in the pharmaceutical industry in adding small amounts of API to a parent material. Further, the process vessel 18p can also be used in the coloring industry as well as the food and spice industries.

Still referring to FIG. 17, the process vessel 18p can include the injection/extraction port 42p. The injection/extraction port 42p can be used to extract materials from the process vessel 18p. In some implementations, the process vessel 18p can include multiple injection/extraction ports 42p. The process vessel 18p can include multiple levels and stages of reacting, with each level having at least one plate 22p. Some materials may finish reacting at different levels of the process vessel 18p and can be extracted using the injection/extraction port 42p prior to reaching the outlet 26p. The injection/extraction port 42p can be positioned along any side and location of the process vessel 18p and can extract materials from any level or stage in the process vessel 18p. In other implementations, the injection/extraction port 42p can be used to introduce materials into the process vessel 18p, in addition to the inlet 20p and the sprayers 44p.

The process vessel 18p can also include the vent 100p. The vent 100p can be positioned along any location on the process vessel 18p, or as shown in FIG. 17, at the top of the process vessel 18p. In applications such as spraying a coating onto at least one process ingredient, the vent 100p allows the user to operate under atmospheric conditions. The vent 100p can be an opening, an outlet or hole that allows air into or out of the process vessel 18p. In some implementations, a pressure relief valve (not shown) can be coupled to the process vessel 18p to control the pressure levels in the process vessel 18p instead of the vent 100p. The pressure relief valve can be configured to allow the operator to operate the process vessel 18p at full pressure or partial pressure and to keep the pressure constant as the materials pass through the process vessel 18p.

In other implementations, the process vessel 18p can include a vacuum port (not shown) instead of the vent 104. The vacuum port can be coupled to a vacuum source and be configured to create a full or partial vacuum environment in the process vessel 18p. The vacuum conditions can reduce or eliminate drag as materials are introduced by the sprayers 44p into the process vessel 18p. The vacuum port can be coupled to any position or location on the process vessel 18p. In one implementation, the vacuum port can be positioned on the top of the process vessel 18p. In some applications, such as spray coating a liquid with powder by spraying a fine mist of droplets into a fluidized bed of powder, the droplets tend to stay apart and not join into larger particles during the spraying process. Each droplet permeates the powder-fluidized bed and becomes coated before more recently added liquid droplets have a chance to catch up and join with the previously sprayed droplets.

In FIG. 17, the process vessel 18p includes the sweep gas port 110. The sweep gas port 110 can inject gas into the process vessel 18p. In drying applications, a gas, in low volume, can be used for reaction with the materials in the process vessel 18p. The gas can be introduced or injected via the sweep gas port 110. In this implementation, no excess reaction gas is needed for the fluidization of the particles, because the fluidization is mechanical and does not require gases, which would be wasted using a traditional gas fluidizer. Further, the sprayer 44p, the port 42p, the vent 104, the inlet 20p and the outlet 26p can be used in combination with the sweep gas port 110 to react the materials in the process vessel 18p. The sweep gas can be located along any portion of the process vessel 18p. In one implementation, as shown in FIG. 17, the sweep gas port is formed through the bottom section of the process vessel 18p. The gas can be applied to any level or stage of the process vessel 18p. Other forms of drying and spraying in different configurations can be used in conjunction of other spraying methods, such as the Wurster method. The method uses the sprayers 44p to spray a coating onto particles that have been separated from each other with a higher velocity gas stream than is used to fluidize the particles. The process uses a partition in the process vessel 18p to separate the separated particles that have just been sprayed and those that have been sprayed.

The particles dry when they are falling back to the fluidized bed to prevent agglomeration.

The process vessel 18p configured with the sweep gas port 110 can be used in many industries, but the main industries are the food, pharmaceutical, and industrial sectors. Some examples of products produced by each industry are milk powder, coffee, tea, cereal, and spices for the food industry; antibiotics, medical ingredients, and additives for the pharmaceutical industry; and paint pigments and ceramic materials for the industrial industry. Spray drying applications can use similar if not the same equipment as specified previously for coating applications.

The process vessel 18p can further include the temperature measuring device 112. The temperature measuring device 112 can be disposed within the process vessel 18p. The process vessel 18p can be configured with one temperature measuring device 112 or multiple temperature measuring devices 112. Multiple temperature measuring device 112 can monitor the temperature of the materials inside the process vessel 18p or the conditions inside the process vessel 18p. The temperature measuring device 112 can be disposed at different levels and stages of the process vessel 18p and can be aligned with different plates 22p inside the process vessel 18p. The temperature can indicate if the at materials are being fluidized, coated, reacted or mixed substantially uniformly. The temperature measuring device 112 can include any type of device that measures temperature, for example and without limitation, thermocouples, resistance temperature detectors (RTD), thermistors, and infrared detectors.

In some implementations, the near-infrared (NIR) sensor 114 can be used to monitor the process vessel 18p during operation. The NIR sensor 114 can monitor the reaction and/or mixing process in real-time. The NIR sensor 114 can be similar to the detectors available from Goodrich ISR Systems (Princeton, N.J.) that are used to perform a NIR spectroscopy. The NIR sensor 114 can view the materials in the process vessel 18p through a NIR transparent material. Then, NIR spectroscopy can be used to determine the mixedness and the current stage of the process. For example, NIR spectroscopy can be used to determine if the materials in the process vessel 18p are sufficiently coated, wet, dry or reacted.

Figure 18:
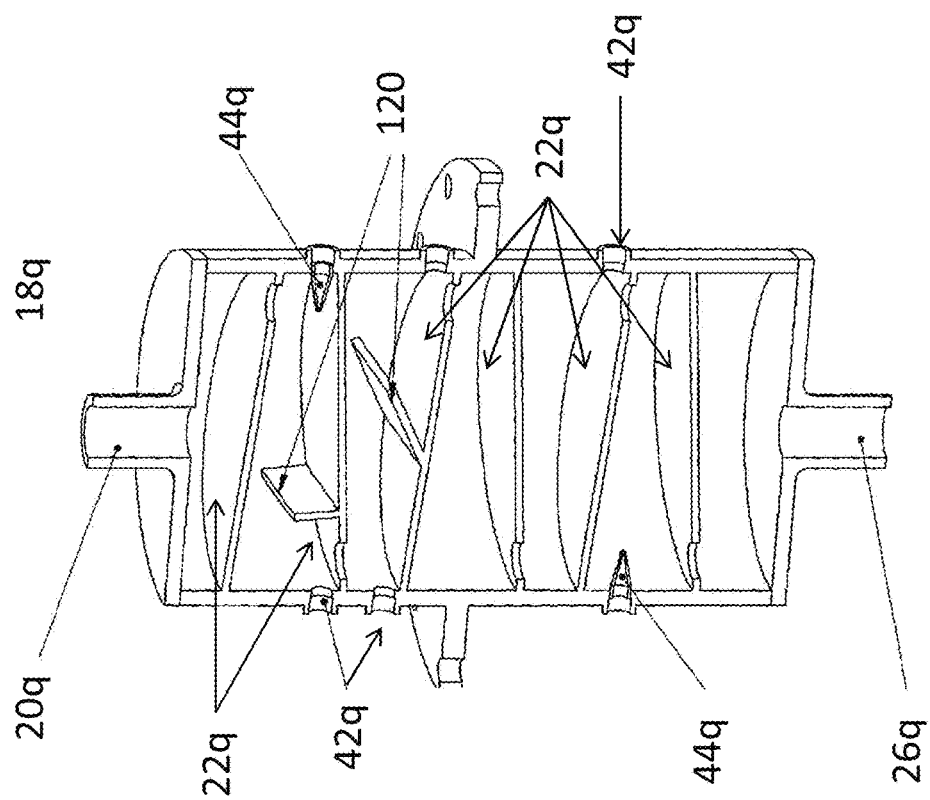

FIG. 18 shows fourth example process vessel 18q. The process vessel 18q is similar to the process vessel 18a, but includes a baffle 120 coupled to at least one of the plates 22q. The process vessel 18q further includes an inlet 20q, two sprayers 44q, an injection/extraction port 42q, a plurality of plates 22q, and an outlet 20q. Materials can be introduced into the process vessel 18q through the inlet 20q, the sprayers 44q, and/or the injection/extraction port 42q and come into contact with the plates 22q. The baffle 120 can be coupled to the plates 22q to direct and affect the flow pattern of the materials as they pass through the process vessel 18q. The baffles 120 can create additional reacting and mixing of the materials in the process vessel 18q due to more particle to particle collision. The configuration of the baffles 120 in the process vessel 18q can be designed based upon the materials to be mixed and the desired end product.

Figure 19:
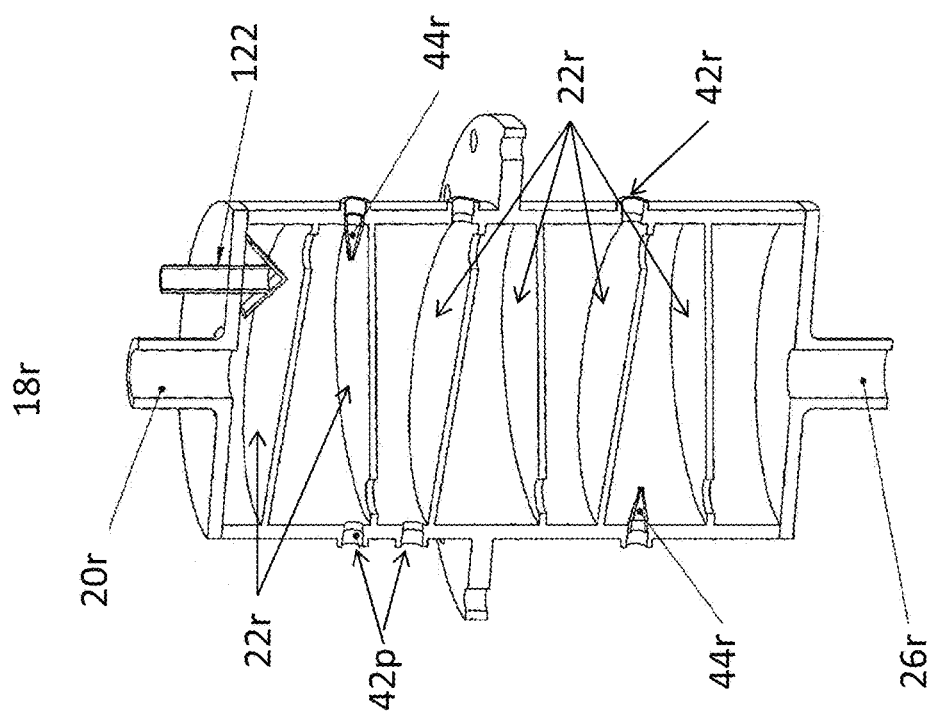

FIG. 19 shows another example process vessel 18r. The process vessel 18r includes an inlet 20r, a plurality of plates 22r, two sprayers 44r, a injection/extraction port 42r, an outlet 26r, and a shielded vent 122. Materials can be introduced into the process vessel 18r through the inlet 20r, the sprayers 44p, and/or the injection/extraction port 42p. When the materials come into contact with the plates 22r they can be deflected in a variety of directions. The shielded vent 122 prevents materials that may splash up during operation from exiting out of the process vessel 18r at the wrong stage of process, for example, before the materials reach the outlet 26r. In other implementations, the baffles 120 from the process vessel 18q can be configured to shield the sprayer 44r, the ports 42r, and the pressure relief valve from taking on materials that can splash up during processing.

Figure 20:
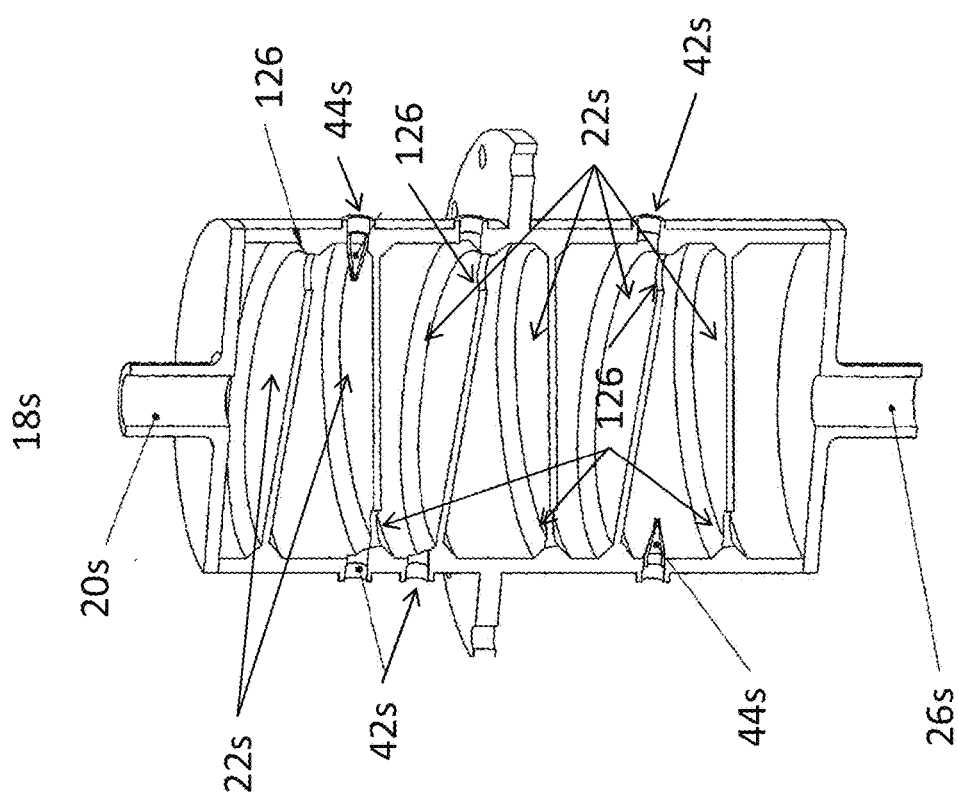

FIG. 20 shows another example process vessel 18s. The process vessel 18s includes an inlet 20s, a plurality of plates 22s, two sprayers 44s, an injection/extraction port 42s, and an outlet 26s. Materials can be introduced into the process vessel 18s through the inlet 20s, the sprayers 44s, and/or the injection/extraction port 42s and come into contact with the plates 22s. Instead of the materials flowing from one level in the process vessel 18s through an orifice 23e as shown in FIG. 7, each of the plates 22s can be configured with a chamfer shaped edge 126 to direct the materials to the next level in the process vessel 18s. The chamfer edges 126 can include a cut away, right angled edge or corner to make a symmetrical sloping edge. In some implementations, the plates 22s can be configured with a radius shaped corner (not shown), instead of the orifice 23e or the chamfer shaped edge 126. The radius corners can be configured to mitigate dead zones and caking in the corners of a cylindrical process vessel 18s.

Controlling Temperature in the Continuous Processing System

The processing system 10 can be used for mixing variety of processes, for example mixing, combining, drying, coating, segregating, and/or reacting materials, that require addition of heat or the removal of heat. Heat can be dissipated as a result of the work being done on materials during the process in the process vessel 18. The heat can be unwanted, and thus cooling the materials in the process vessel 18 or the process vessel 18 may be desirable for some reactions.

Figure 21:
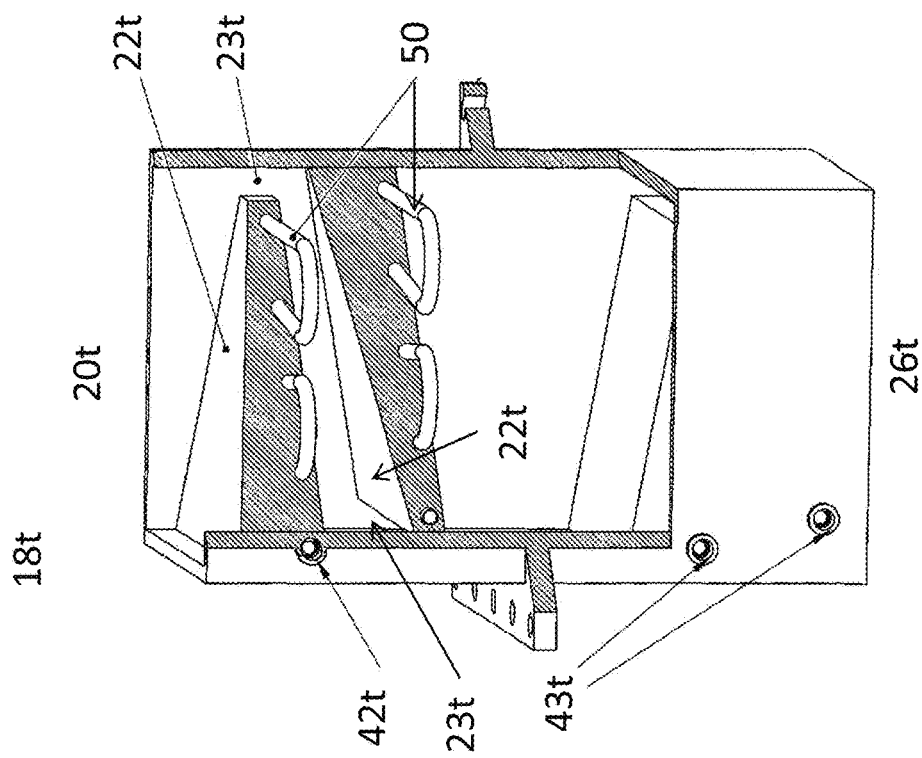
FIGS. 21-22 are cutaway perspective views of various example implementations of a temperature controlled continuous process vessel.

Now referring to FIG. 21, an example temperature-controlled process vessel 18t is shown. The process vessel 18t includes an inlet 20t, a plurality of plates 22t, a fluid inlet 42t, a fluid outlet 43t, and an outlet 26t. The process vessel 18t is similar to process vessel 18a, but process vessel 18t further includes a fluid pathway 50 for controlling the temperature of the plates 22t. The fluid pathway 50 can be disposed within the plates 22t to control the temperature of the surface of the plates 22t.

Process ingredients can be introduced into the process vessel 18t through the inlet 20t and come into contact with the plates 22t, including orifices 23t. During operation, heat can generated as a result of the processing of materials in the process vessel 18t. The fluid pathway 50 can carry a coolant to cool the plates 22t through which it passes. In other implementations, the fluid pathway can be configured to carry a heated fluid to heat the plates 22t. In still other implementations, the plurality of plates 22t can include a resistive heating element (not shown) to control the temperature of the plates 22t.

The fluid carried by the fluid pathway 50 can be introduced through the fluid inlet 42t. The fluid inlet 42t can be positioned along at least one side of the process vessel 18t. In some implementations, the process vessel 18t can include multiple fluid inlets 42t. The fluid can be discharged out of the fluid pathway 50 through the fluid outlet port 43t. The fluid outlet port 43t can be similar to the outlet 26t. The outlet port 43t can be positioned along at least one side of the process vessel 18t. In some implementations, the outlet port 43*t* can be positioned along the bottom of the process vessel 18*t*. The process vessel 18*t* can further include multiple outlet ports 43*t*.

In some implementations, a system including the process vessel 18*t* can include a pump to recruit the fluid through the fluid pathway 50. The system may also include a heater or a chiller to heat or cool the fluid before it is introduced into the fluid inlet 42*t*.

Figure 22:
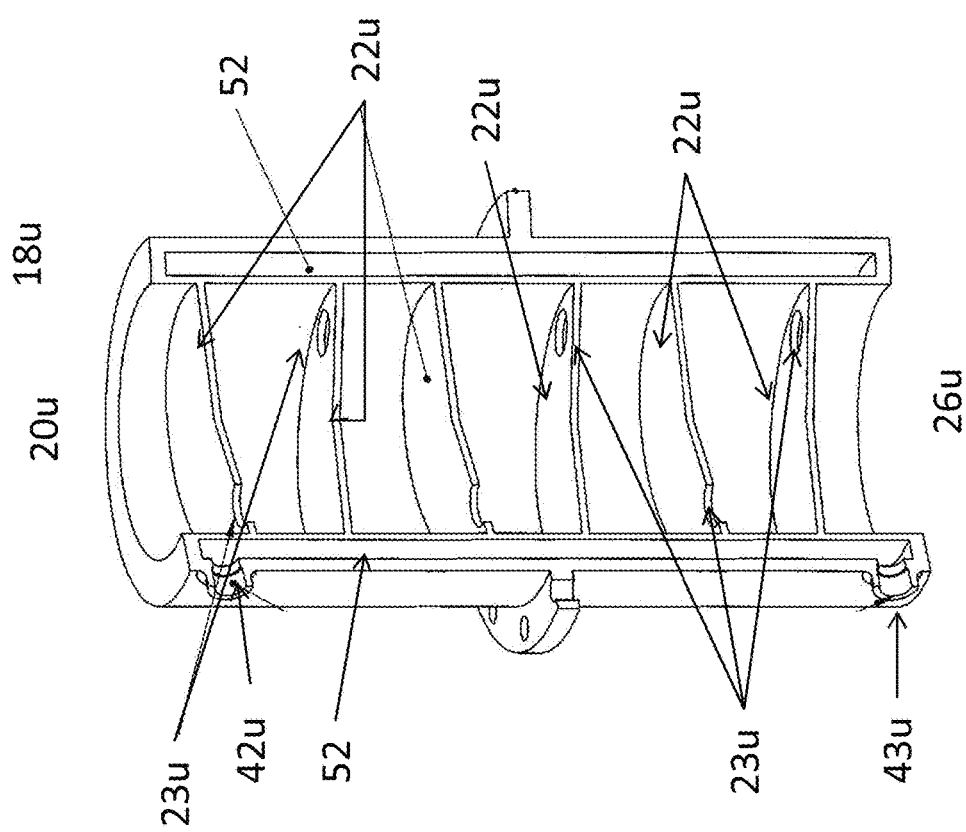

FIG. 22 shows another example temperature-controlled process vessel 18*u*. The process vessel 18*u* includes an inlet 20*u*, a plurality of plates 22*u* including orifices 23*u*, a fluid inlet port 42*u*, a fluid outlet port 43*u*, an outlet 26*u*, and a cavity 52. During some operations it can be important to control the temperature of the process vessel 18*u*. The process vessel 18*u* is configured with the cavity 52 positioned between an inner wall of the process vessel 18*u* and an outer wall of the process vessel 18*u*. The cavity 52 can be configured to provide a jacket layer for the process vessel 18*u*. The cavity 52 can be a cooling jacket or a heating jacket and can be disposed around the process vessel 18*u* to keep the materials inside at a desired temperature during the process. In some implementations, the cavity 52 can be configured to provide a heat transfer interface for the process vessel 18*u*. Heated or chilled fluids can be introduced into the cavity 52 of the process vessel 18*u* through the fluid inlet port 42*u*. In some implementations, the heated or chilled fluids can be extracted from the cavity 52 of the process vessel 18*u* through the fluid outlet port 43*u* in addition to the outlet 26*u*. Further, the cavity 52 can be configured between the inner wall and outer wall of any extension sections 34*e* or base sections 40*e*, as shown in FIG. 7, to control the temperature of those sections.

Examples of Using the Continuous Processing System

As previously stated, the processing system 10 can be used to process a wide range of materials in a variety of applications. In one implementation, the processing system 10 can be configured to inject various substances and combinations of these substances, e.g., liquids, gases, or solids at any level of a process vessel 18. This capability allows increased efficiency in the formation of materials from various chemicals. In particular, a main stay of the chemical processing industry in the Continuous Stirred Tank Reactor (CSTR). In this type of reactor chemicals are simultaneously injected into a vessel, then mixed with an impeller. Depending upon the chemicals used for feedstock in the reaction the reactions can be quite complex and result in creation of undesirable products, or low yields. Processing system 10 can be used to provide the functionality of a CSTR more efficiently and with taking up less space.

For example, consider a process for forming a multi-component mixture of materials that include constituent A, constituent B, constituent C and constituent D. Suppose constituent A combined with constituent B, this results in product E. If constituent A has not fully mixed with constituent B and in turn reacts with other constituents C and/or D, this can result in an undesired byproduct. Additionally, if the materials are simultaneously injected into a vessel, then mixed, this can result in creation of an undesirable product. The only way that this can be avoided in a CSTR system is to have multiple CSTR reactors in series, wherein constituent A is mixed with constituent B in a separate vessel and then the product, constituent E is mixed with constituent C a separate vessel. In contrast, with the processing system 10, constituent A can be combined with constituent B to produce Product E to completion at an upper stage of a process vessel 18, then at a lower stage in the process vessel 18 constituent C can be added to Product E without constituent C reacting individually with constituent A or constituent B, as they have been previously consumed to from product E without forming the undesirable by product. Similarly, once could do the same with constituent D. Thereby reducing the amount of equipment needed to produce the desired end product. Moreover, this same capability can be continued throughout the length of the reactor for "n" number of constituents and "n−1" number of products. This unique capability would preclude the need for multiple, e.g., "n−1", CSTR's, resulting in significant cost savings.

In other implementations, the processing system 10 can be used with hard to fluidize materials that include cohesive powders which tend to rat hole and exhibit plug flow if fluidized with standard fluidizers. As materials become smaller and smaller, they tend to become more cohesive. Pharmaceutical materials are typically very cohesive. Typical active pharmaceutical ingredients (API) fall within particle size and Geldart groups of powders. The Geldart Groupings of powders was first used by Professor Geldart to describe and characterize different powders on how they fluidize in pneumatic driven fluidizers. Group C powders are powders that are in any way cohesive. It is extremely difficult to fluidize Group C powders using conventional fluidizers such as a pneumatic bed, and a vibratory pneumatic bed because the powders either lift as a plug in small diameter tubes, or channel (form rat-holes). Mechanical agitation can be applied to help avoid the aforementioned phenomena, but this approach is not guaranteed to work. Plug flow causes no fluidization and channels only cause local fluidization and both are unwanted for spray coating applications because, without constant uniform turnover of the material, the spray will cause liquid rich zones that form clumps.

By using the processing system 10 to uniformly fluidize the material, a process vessel 18 configured with a sprayer 44 as shown FIG. 17, can be used to continuously spray on new material and avoid the formation of clumps. Because the processing system 10 does not rely on pneumatics to form the fluidized bed, the spray can also be applied under near vacuum conditions. Further, the mode of fluidization caused by this mixing process can react and mix even very small particles, e.g., micron, submicron and nano particles, which would tend to be carried out of a vessel by fluidization air, used in other processing systems.

A number of applications of processing system 10 were tested by the applicant. They are briefly described below. In all of the following examples, the processing system 10*a*, as shown in FIG. 1, was used. The processing system 10*a* includes the process vessel 18*a* removably coupled to the acoustic agitator 11*a*.

Mixing of Powder-Powder Systems

In a first example, the processing system 10*a* can be used for mixing powder-powder systems. It is common in such mixing processes for each powder to have a similar in density but to have very different particle size ranges. An experiment was performed to quantify the mixing effectiveness when mixing 95 weight percent (wt %) of granulated sugar and 5 wt % of D-glucose (dextrose) powder. The D-glucose powder in turn contained 0.25 percent by weight of a flow additive. The granulated sugar had a nominal particle size of 600 micrometers (μm) while the D-glucose powder had a nominal particle size of 100 μm. The bulk density of the granulated sugar was 0.80-0.88 grams per cubic centimeter (g/cc). The bulk density of the D-glucose was 0.64 g/cc.

Each material was added to processing system 10*a* using a separate volumetric based powder feeder. The minor constituent, D-glucose, was added at a rate of 15±0.5 grams per minute (g/min) while the major component, granulated sugar, was added at a rate of 283.4±5 g/min. Processing system 10 was operated with f 60g of acceleration, with one g of acceleration being the force of gravity. Sampling cups were used to capture two second duration samples of material exiting process vessel 18a. Ten samples were collected for analysis to determine the consistency of the D-glucose concentration.

The test method used to quantify D-glucose (dextrose) concentrations in powder samples utilizes the YSI 2700 Select Biochemistry Analyzer (Yellow Springs, Ohio). The principle of operation of the assay is based on the enzymatic (glucose oxidase) conversion of glucose to hydrogen peroxide and a byproduct (D-glucono-δ-lactone). The hydrogen peroxide is electrochemically oxidized at the anode of the probe sensor, producing a signal current indicative of the original D-glucose concentration. The concentration results were then statistically analyzed to determine the relative standard deviation (% RSD) which is a common metric used to describe mix quality for powder-powder systems. This experiment produced a 6.7% RSD for the granulated sugar-glucose powder mixture.

Mixing of Powder-Powder Systems for Pharmaceutical Industry

In a second example, the processing system 10a can be used for processing of power-powder systems for pharmaceutical products. In the pharmaceutical industry, microcrystalline cellulose powder is one of the common excipients used to carry active pharmaceutical ingredients (API). An experiment was performed to quantify the mixing effectiveness of the processing system when mixing 95 wt % of Avicel® PH-200 microcrystalline cellulose powder with 5 wt % D-glucose (dextrose) powder containing 0.25 wt % flow additive. The Avicel® PH-200 has a median particle size of 210 μm while the D-glucose powder particle size is nominally 100 μm. The Avicel® PH-200 has a bulk density of 0.29-0.36 g/cc as compared to 0.64 g/cc bulk density for the D-glucose.

Each material was added to processing system 10a using a separate volumetric based powder feeder. The minor constituent, D-glucose, was added at a rate of 4.5±0.1 g/min while the major component, Avicel® PH-200, was added at a rate of 102±1 g/min. Processing system 10a was operated with about 60 g's of acceleration. Sampling cups were used to capture two second duration samples of material exiting the process vessel 18a. Ten samples were collected for analysis to determine the consistency of the D-glucose concentration.

The test method used to quantify D-glucose (dextrose) concentrations in powder samples utilizes the YSI 2700 Select Biochemistry Analyzer (Yellow Springs, Ohio). The principle of operation of the assay is based on the enzymatic (glucose oxidase) conversion of glucose to hydrogen peroxide and a byproduct (D-glucono-δ-lactone). The hydrogen peroxide is electrochemically oxidized at the anode of the probe sensor, producing a signal current indicative of the original D-glucose concentration. The concentration results were then statistically analyzed to determine the relative standard deviation (% RSD) which is a common metric used to describe mix quality for powder-powder systems. This experiment produced a 2.7% RSD for the microcrystalline cellulose powder-glucose powder mixture.

Mixing of Powder-Powder System with Restricted Outlet

In a third example, the processing system 10a can be used for processing powder-powder systems where the process vessel 18a has a restricted outlet 26a. An experiment was performed to quantify the mixing characteristics of powder-powder mixing when the process vessel 18a was configured with the restricted outlet 26a. The experiment utilized 95 wt % Avicel® PH-200 microcrystalline cellulose powder and 5 wt % D-glucose (dextrose) powder containing 0.25 wt % flow additive. The Avicel® PH-200 has a median particle size of 210 μm while the D-glucose powder particle size is nominally 100 μm. The Avicel® PH-200 has a bulk density of 0.29-0.36 g/cc as compared to 0.64 g/cc bulk density for the D-glucose.

Each material was added to process vessel 18a using a separate volumetric based powder feeder. The minor constituent, D-glucose, was added at a rate of 4.5±0.1 g/min while the major component, Avicel® PH-200, was added at a rate of 102±1 g/min. The processing system 10 was operated with an acceleration of about 60 g's. The process vessel 18a was operated for 12 minutes to establish a steady state condition. At that time, while still operating, a plug was placed in the exit of the process vessel 18a to completely block flow. The processing system 10a was operated for an additional four minutes to allow a buildup of material inside the process vessel 18a at the lowest stage prior to the outlet 26a. At this point in time, the processing system 10a was brought to a halt while simultaneously halting the inlet powder flows. The sides of the processing system 10a were removed to expose the material in the bottom of the apparatus. A sample thief was used to collect two gram samples at five locations throughout the material that accumulated in the bottom of the process vessel 18a. These samples were then used to determine the consistency of the D-glucose concentration.

The test method used to quantify D-glucose (dextrose) concentrations in powder samples utilizes the YSI 2700 Select Biochemistry Analyzer (Yellow Springs, Ohio). The principle of operation of the assay is based on the enzymatic (glucose oxidase) conversion of glucose to hydrogen peroxide and a byproduct (D-glucono-δ-lactone). The hydrogen peroxide is electrochemically oxidized at the anode of the probe sensor, producing a signal current indicative of the original D-glucose concentration. The concentration results were then statistically analyzed to determine the relative standard deviation (% RSD) which is a common metric used to describe mix quality for powder-powder systems. This experiment produced a 4.6% RSD for the microcrystalline cellulose powder-glucose powder mixture that was held up at the outlet.

Establishing Improved Mass Transport

Figure 23:
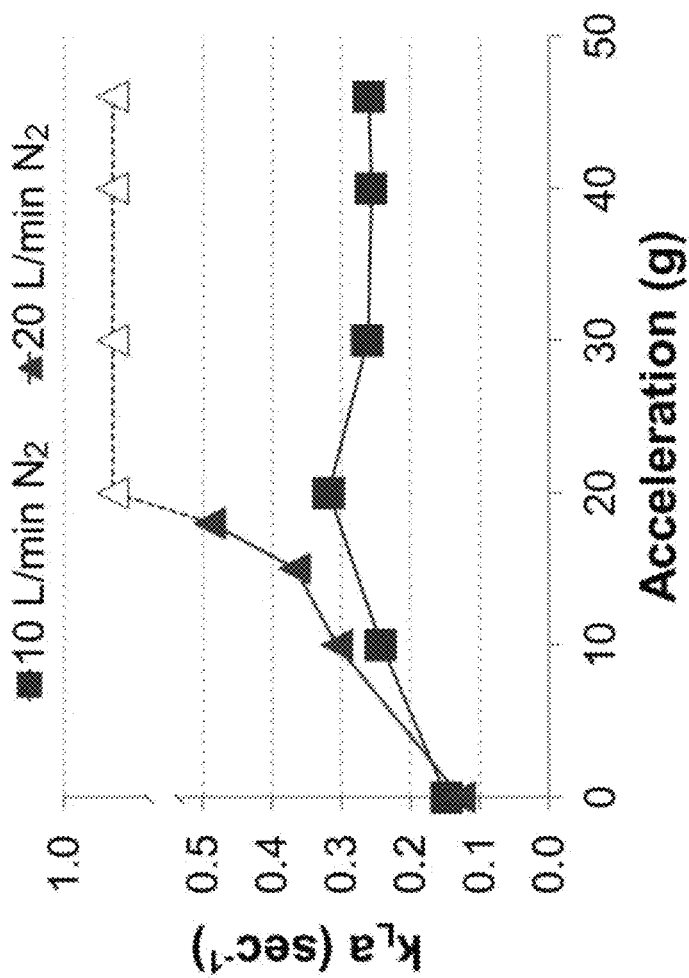
FIG. 23 shows oxygen mass transfer rate data obtained using the continuous processing system.

In a fourth example, the processing system 10a can be used for establishing improved transport of materials. An experiment was performed to quantify an important indicator for the conduct of chemical reactions, e.g., gas-liquid mass transport. In order to illustrate that this implementation produces an appealing chemical processing conditions, some preliminary tests were conducted. These tests, the results of which are shown in FIG. 23, involved measuring oxygen transfer rate as follows. Nitrogen flowing co-currently at 10 or 20 L/min was used to drive out oxygen in water flowing at 61 L/min through a prototype continuous mixer originally designed for powder-powder mixing and shown in FIG. 23, which shows a graph of the preliminary oxygen mass transfer rate data obtained during this test. Although the process vessel used in these tests was not designed specifically for liquid flow and the water to nitrogen ratio used in these experiments was not optimized, the $k_L a$ values of 0.5 sec$^{-1}$ are very good, (The higher data points depicted as white triangles connected via dotted lines were too deoxygenated at the outlet to calculate $k_L a$ values.)

The obtained $k_La$ values in these preliminary experiments greatly exceeds values attainable in CSTRs, which typically range from 0.01 to 0.05 sec$^{-1}$, with highest reported values only achieving up to 0.2 sec$^{-1}$. This implementation can be used as a process vessel specifically for liquid based multiphase systems that will have optimized operation conditions (flow rate, acceleration, gas/liquid ratio, and retention time). Due to the high interfacial area produced by the turbulent nature of the agitation, optimization of the test conditions will result in increases in $k_La$ over the results presented in FIG. 23.

Figure 24:
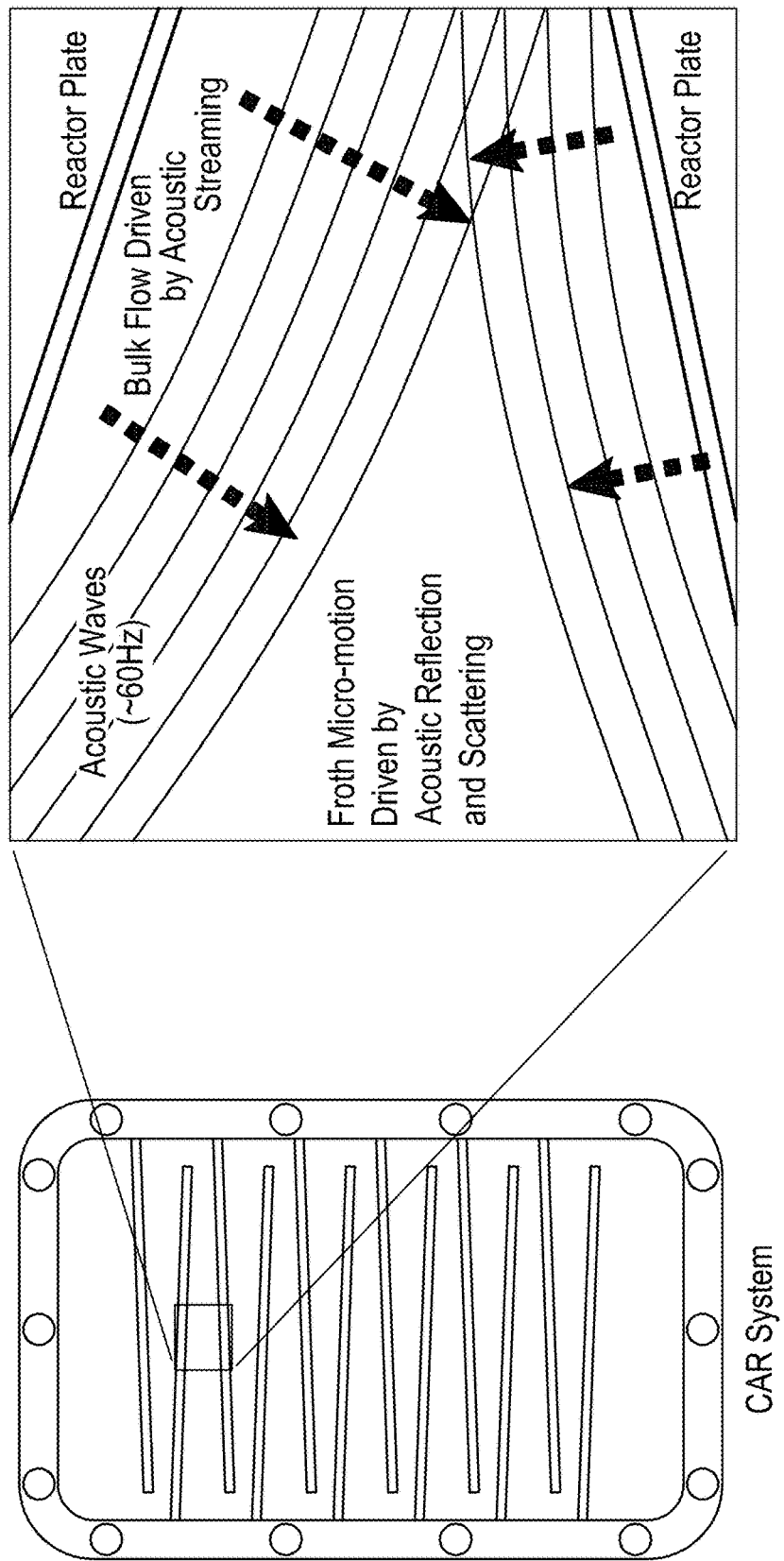
FIG. 24 shows one implementation of the materials reacting in the continuous processing system.

FIG. 24 shows an illustrative example of materials during operation of the processing system 10a. FIG. 24 shows the processing system's 10a ability to create a replenishing froth for superior mass transport across phases. Additionally, the processing system 10a allows two or three phase mixing (gas/liquid/solid or liquid/gas). The implementation shown in FIG. 24 uses acoustic streaming to induce a uniform energy dissipation rate field throughout a process vessel, such as process vessel 18a as shown in FIG. 1, for improved mass transport. As illustrated in FIG. 24, the acoustic streaming creates bulk flow while the interaction of the two or three phase materials with the acoustic waves creates chaotic motion at a micro-scale resulting in a froth condition. The froth is essentially transient foam that maximizes the gas/liquid interface while constantly breaking down and reforming to maintain fresh gas and liquid at the interface.

Establishing Improved Flow of Materials

In a fifth example, the processing system 10a can be used for liquid-liquid processes where the process vessel 18a has a restricted outlet 26a. In this example, the processing system 10a included two hoppers 8a, a support frame 9a, and a process vessel 18a coupled to an acoustic agitator 11a. The acoustic agitator 11a included an electrical cabinet 12a and a resonance assembly 14a. The process vessel 18a was configured with 12-8"×8" plates 22a and each plate had a slope of about 1.43°. Additionally, each of the plates 22a was configured with 8 orifices 23a cut into one end of the plate 22a to allow the aqueous solution to flow to the next level in the process vessel 18a. The orifices 23a were configured to be 100% open.

An experiment was performed to quantify the mixing characteristics of liquid to liquid mixing when the process vessel 18a was configured with the restricted outlet 26a. The main liquid stream utilized in this experiment was local tap water with a baseline conductivity of between 150 and 250 µS. A second aqueous solution containing 100,000 ppm sodium chloride was placed in the two valve gravity fed hopper 8a. The conductivity of the liquid stream exiting the process vessel was directly monitored in the exit stream using an inline conductivity probe (Cole-Parmer 19500-45) and AlphaCon 200 (Cole-Parmer) control box.

The main liquid stream was regulated with a flow meter to 17 L/min with a first flow inlet 2a fixed to the top of the process vessel 18a, while the concentrated saline solution was added via a second flow inlet 2b, also fixed to the top of the process vessel 18a. The initial flow rate of the concentrate was set to 150 g/min and was adjusted until the liquid exiting the process vessel had a consistent conductivity of 1600 to 1700 µS. The processing system 10a was operated with a peak amplitude of about 50 g's of acceleration. The process vessel 18a was operated for 3 minutes to establish a steady state condition. At that time, while still operating, the concentrated salt solution feed was turned off. The processing system 10a was operated for an additional 2 minutes to allow all the salt solution remaining in the process vessel 18a to washout. The conductivity was measured and recorded at 0.5 sec intervals over the 4 minute window described above to yield a step function, in this case the washout function, W(t). Integration of this curve (eqn 1, provided below) provided the average residence time ($\bar{t}$) a packet of particles was present in the process vessel 18. For this experiment, it was determined to be 17.5 sec.

$$\bar{t} = \int_0^\infty W(t)dt \qquad \text{eqn. 1}$$

Figure 25:
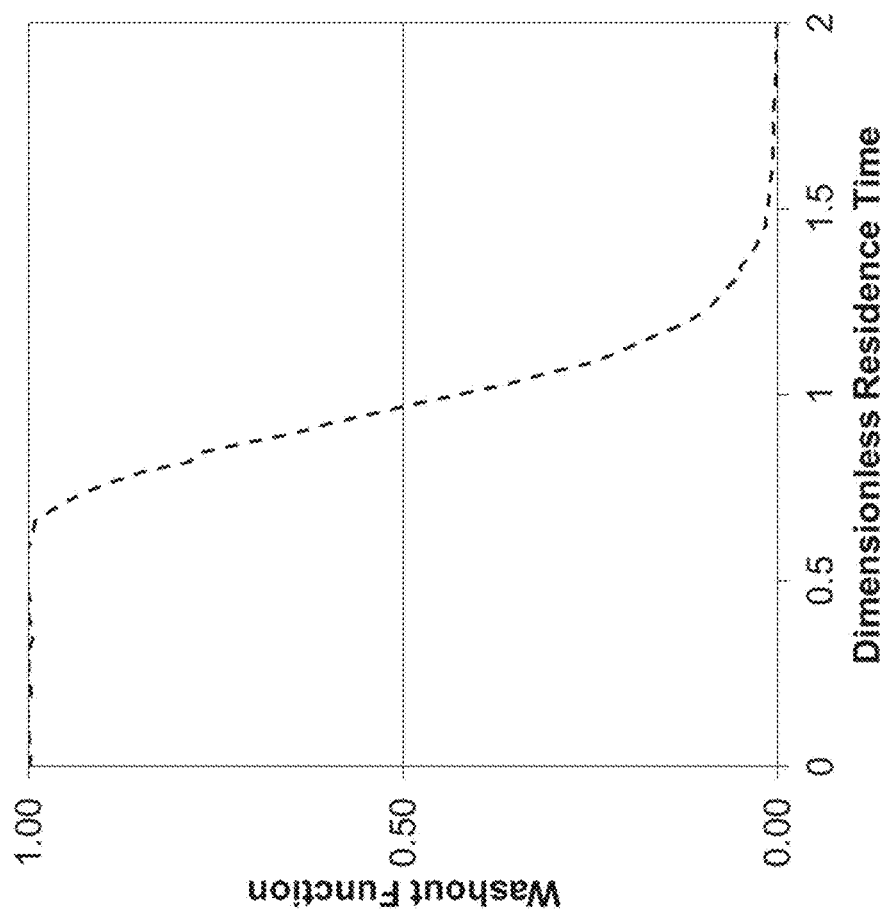
FIG. 25 shows a plot of a washout function of the process vessel.

By dividing the measured time by the average residence time, dimensionless time units were obtained and the washout function W(t) plotted in these units is contained in FIG. 25. This measurement allows the process vessel 18a to be compared to other systems, for example CSTR, plug flow reactor (PFR), and laminar pipe flow systems, independent of the size of the relative systems. Using the washout function data and equation 2 (provided below) the dimensionless variance was determined to be 0.023, which indicates that the flow distribution is approaching plug flow ($\sigma^{2=0}$) performance.

$$\sigma^2 = \frac{2\int_0^\infty tW(t)dt}{(\bar{t})^2} - 1 \qquad \text{eqn. 2}$$

One way to model the shape of the washout or other step functions is to fit the curve as if it were some number, N, of equal volume continuously stirred tank reactors arranged in series. The theoretical step function corresponding to N reactors in series can be described by equation 3 (provided below), where F(t) is the step function, N is the number of equivalent stirred tank reactors, and $\theta = t/\bar{t}$ is dimensionless time.

$$F(t) = 1 - e^{-N\theta}\left[1 + N\theta + \frac{(N\theta)^2}{2!} + \ldots + \frac{(N\theta)^{N-1}}{(N-1)!}\right] \qquad \text{eqn. 3}$$

Figure 26:
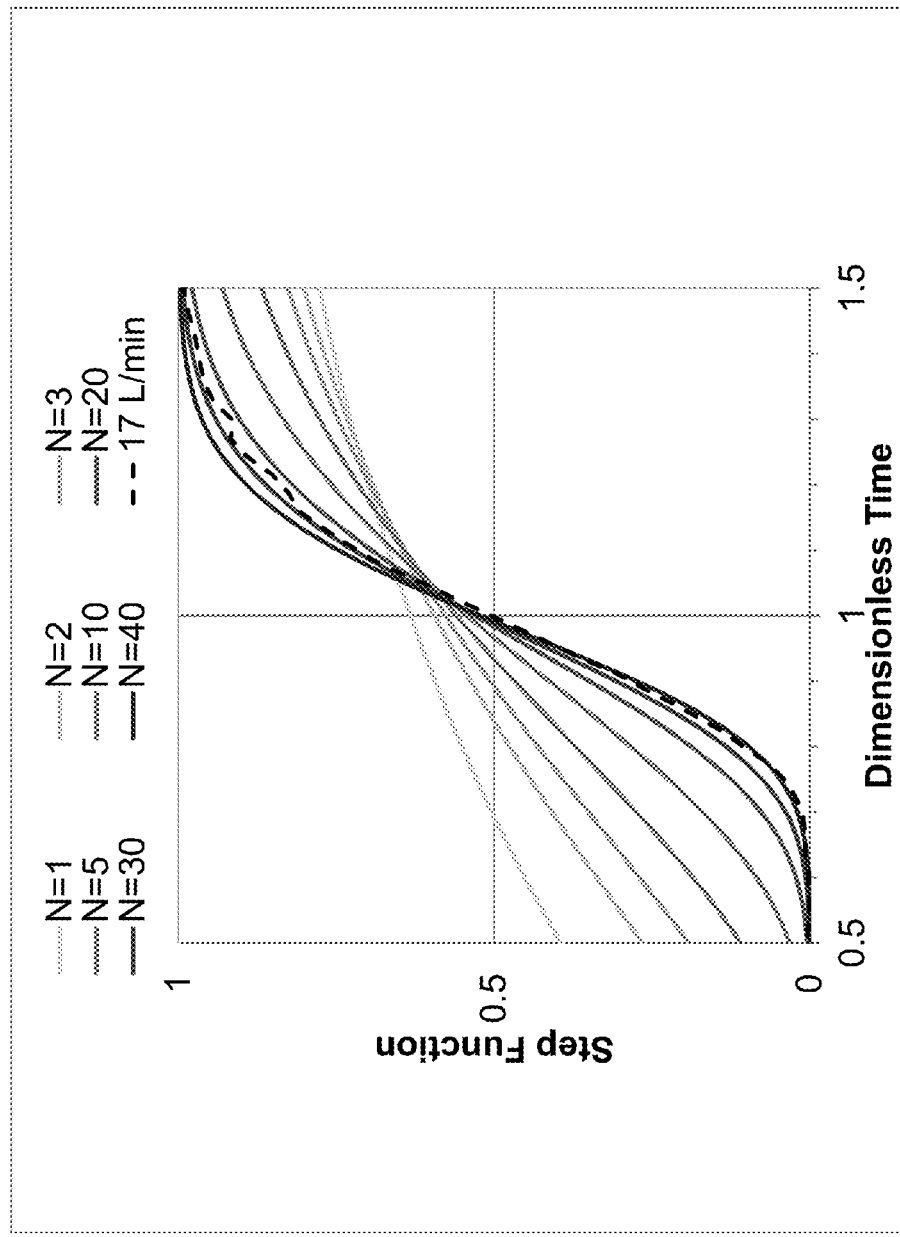
FIG. 26 shows a comparison of the step functions of the process vessel to different CSTR systems.

The measured step function is plotted in comparison to a range of N theoretical stirred tank equivalents in FIG. 26. From the plot in FIG. 26, it is clear that liquid to liquid combination of materials flow through the process vessel 18a at a rate approaching plug flow with a washout curve equivalent to approximately 30 continuous stirred tank reactors in series. The practical limit for use of continuous stirred tank reactors in a series, however configuration is five. The nearness of the continuous acoustic reactor 18a to ideal plug flow (N>5), while providing chaotic axial mixing, is a desirable parameter and can be expected to result in improved conversion in reactive liquid mixing. Modifications to the process vessel inlet and exit can impact the exact shape of the washout function curve pushing it further toward plug or mixed flow as the application may demand.

Figure 27:
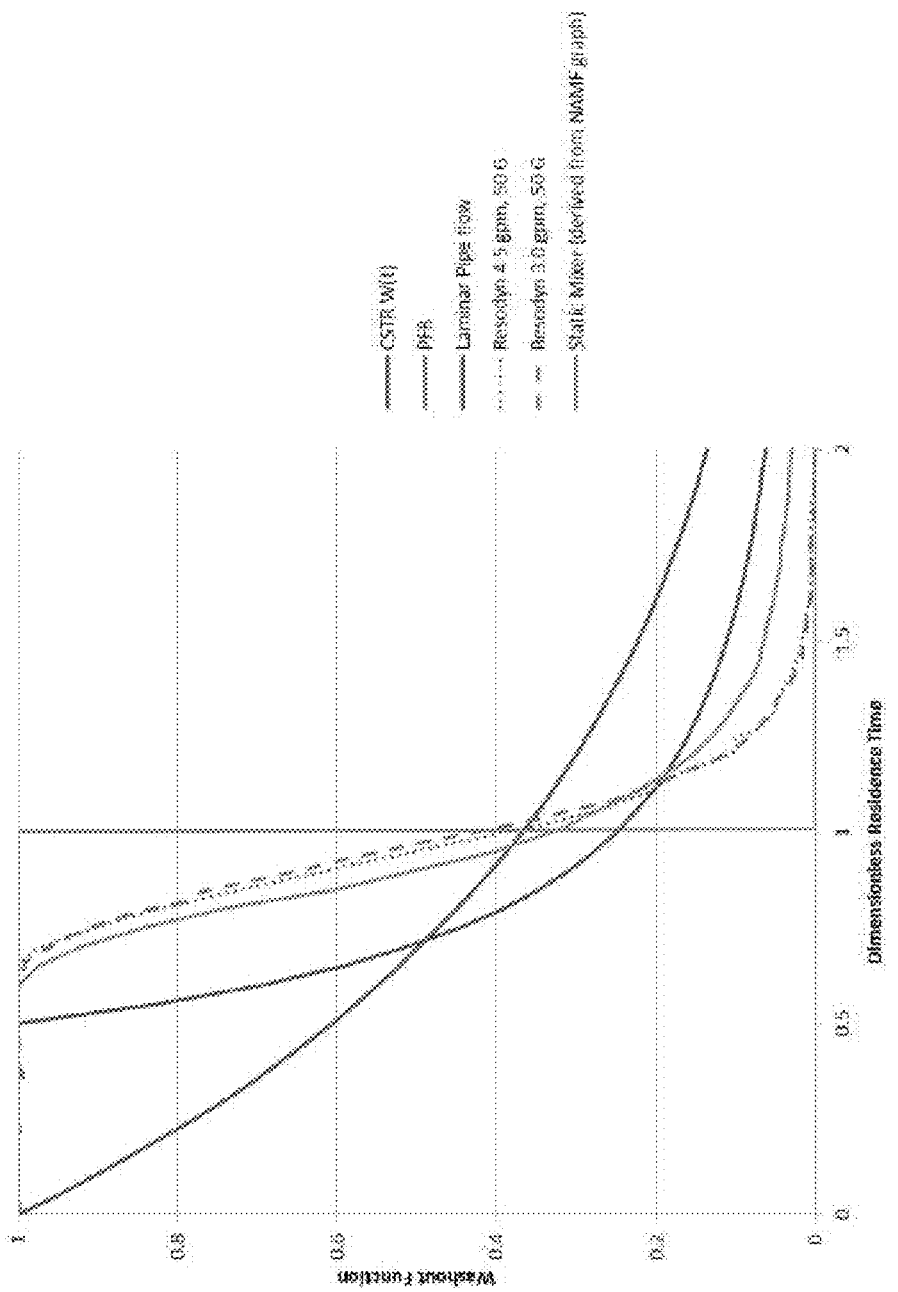
FIG. 27 shows a comparison of residence time washout functions using various systems.

FIG. 27, which shows a comparison of the residence time washout function of the processing system 10a, using data from similar experiments, compared to a CSTR system, a PFR system, and a laminar pipe flow system, under similar conditions. The washout function of the processing system 10a was closer to ideal than the other systems but with more plug flow character than the CSTR system, PFR system and the laminar flow system. For one experiment, the processing system 10a was running at an acceleration of 50 g and the water inlet flow rate was set at 3.0 gpm. For the second experiment, the processing system 10a was still running at an acceleration of 50 g, but the water inlet rate was adjusted to 4.5 gpm. As shown in FIG. 27, the processing system 10a displayed good repeatability, as both experiments resulted in similar washout curve profiles despite different water inlet rates.

The data from FIGS. 25-27 shows the processing system 10a to have greater flow and mixing properties and a closer to ideal flow rate than other reactors in the industry. The greater flow rate can be used to reduce back mixing, when necessary, and allow the processing system 10a to operate close to an ideal plug flow reactor. As a result, the processing system 10a is beneficial for carrying out chemical reactions typically suited for plug flow reactions, for example competitive-consecutive reactions and competitive-parallel reactions. Competitive-consecutive reactions are reactions involving two competing reactions. A first reaction yields a desired end product, and the second unwanted reaction consumes the desired end product of the first reaction providing an undesirable byproduct. In competitive-parallel reactions, two concurrent reactions compete for a limiting reagent, forming a desired and undesired product. Both classes of reactions are particularly sensitive to mixing time and completeness.

The efficiency and completeness of competitive-consecutive and competitive-parallel reactions both mixing sensitive reactions depend upon how fast and completely the reactants are combined. As such, reactors that have a high degree of micro-mixing and bring the most amount of reactant together in a short period of time are desired. These functions are characterized by a Peclet number.

For chemical reactions, the Peclet number is defined to be the ratio of the rate of mass transport by convection to the rate of mass transport by diffusion, or dispersion. The Peclet number, Pe, is described by eqn 4 as follows, where D is the dispersion coefficient for the system and u and L are the linear velocity and path length through the reactor, respectively.

$$P\in = \frac{uL}{D} \quad \text{eqn 4}$$

Thus, a larger Pe number indicates that the system has less dispersion and has more plug flow character than a system with a smaller Pe number. The Pe number is related to the dimensionless variance, $\sigma^2$, according to equation 5, so in practice the washout data described above provides sufficient information to obtain the Pe number.

$$P\in = \frac{2}{\sigma^2} \quad \text{eqn 5}$$

In the processing system 10a described above the dimensionless variance was 0.023, so the corresponding Pe number for the system is 87. Systems with Pe numbers greater than 78 can be modeled as having only a small deviation from ideal plug flow. This demonstrates that the processing system 10a, and other systems having similar architecture are particularly well suited for competitive reactions, including both competitive-consecutive and competitive-parallel reactions.

Figure 28:
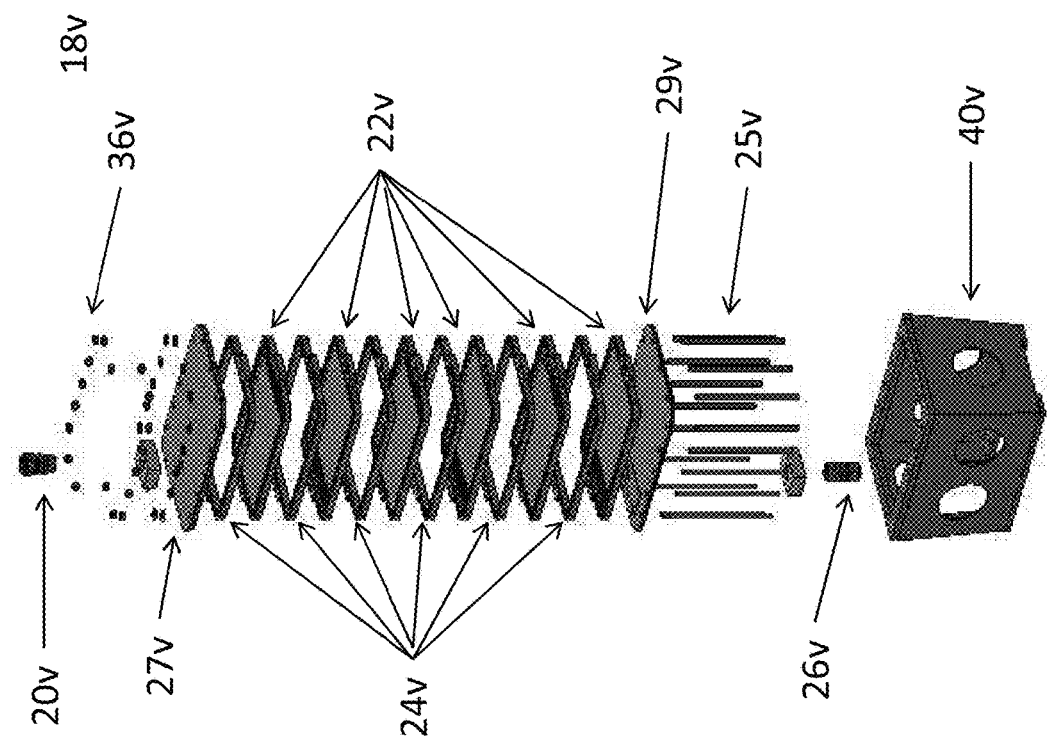
FIG. 28 shows an exploded view of an example process vessel.
Figure 29:
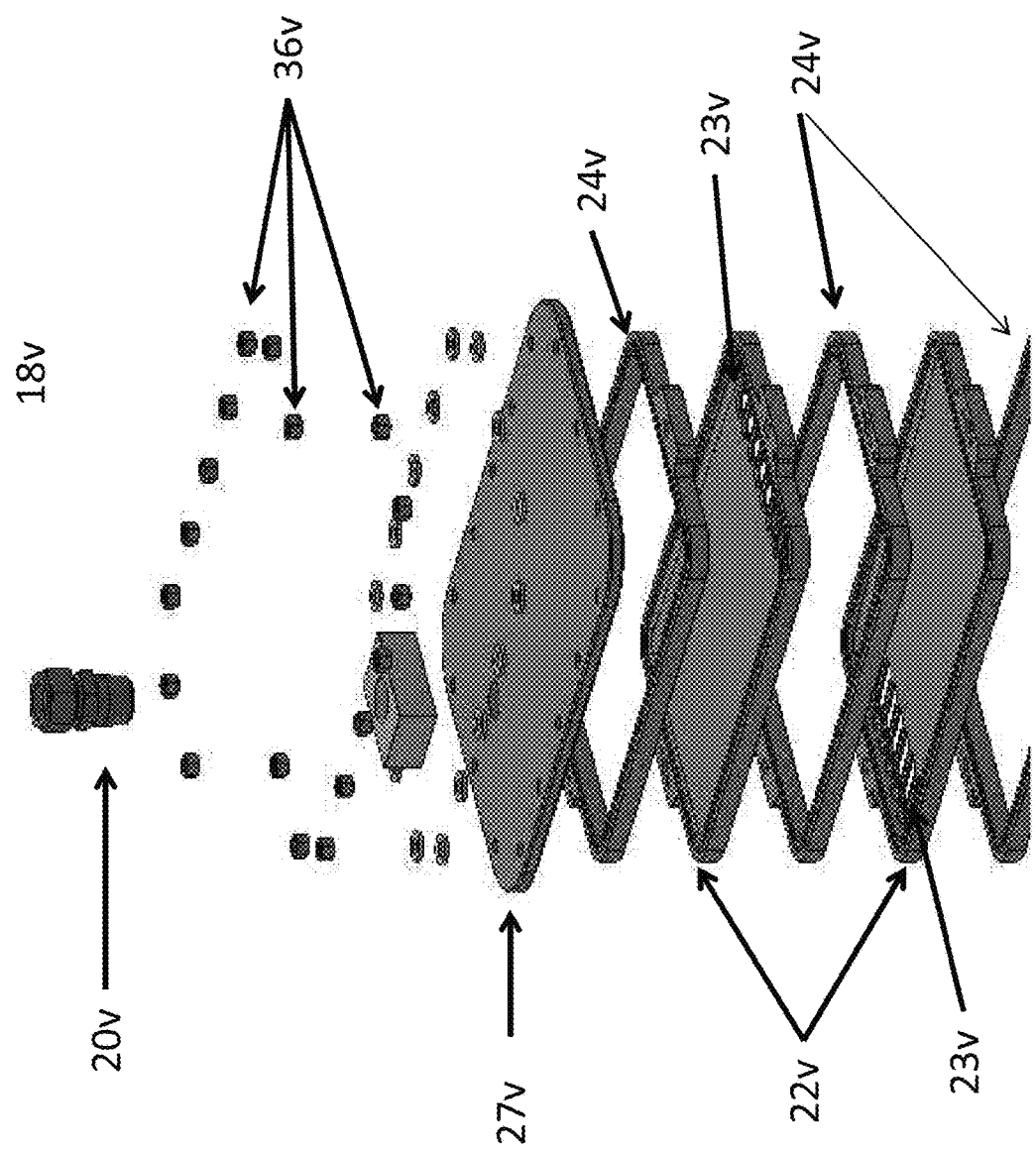
FIG. 29 displays a magnified view of the example process vessel shown in FIG. 28.

FIG. 28 shows an exploded view of a process vessel 18v. FIG. 29 displays a magnified view of the process vessel 18v to show greater detail. The process vessel 18v is similar to the process vessel 18d shown in FIG. 6a. However, the process vessel 18v further includes vessel sections to adjust the gap size between levels and to increase the adaptability of the process vessel 18v. The vessel sections can include vessel plate sections 22v. The surface of the vessel plate sections 22v can be configured in various ways to accommodate different types of materials to be mixed or reacted in the process vessel 18v. In some implementations, the surface of the vessel plate sections 22v can be configured with orifices 23v formed through the plate 22v to allow materials to flow to a next level in the process vessel 18v. The orifices 23v can be formed at the end of the vessel section plates 22v. The angle of the vessel plate sections 22v can be configured to direct the materials towards the orifices 23v, the angle of the vessel section plates 22v can vary from one vessel plate 22v section to another. The angles of the vessel plate sections 22v can be configured dependent upon the materials to be reacted and the desired end product.

The vessel sections can further include the vessel spacer sections 24v. The vessel spacer sections 24v can be located between vessel plate sections 22v and can be of various sizes dependent upon the desired gap size between the levels in the process vessel 18v. The number of vessel spacer sections located between vessel plate sections can vary from zero, to one, to as many is required to create the desired gap size. The different gap sizes create different reacting stages in the process vessel 18v, so the number of vessel spacer sections 24v used between each adjacent vessel plate section 22v can depend on the desired end product as well. The vessel spacer sections 24v can include ports formed through a side or edge to introduce or extract materials from the process vessel 18v at various levels. In some implementations, the vessel spacer sections 24v can have ports formed through a side or edge of the process vessel 18v to inset temperature measuring devices and/or NIR sensors. In other implementations, the vessel spacer sections 24v can have vents formed through a side or an edge to allow air or gas to enter and exit the process vessel 18v. In still other implementations, the vessel spacer sections 24v can have vacuum port formed through a side or an edge to create vacuum conditions in the process vessel 18v. In one implementation, the vessel spacer sections 24v can have a pressure relief valve formed through a side or an edge to control the pressure in the process vessel 18v.

The process vessel 18v can further include a base section 40v, an outlet 26v, a bottom outlet section 29v, alignment rods 25v, fasteners 36v, a top plate 27v, and an inlet 20v. The base section 40v can be configured with pre-drilled threaded holes to receive one end of the alignment rods 25v. The alignment rods 25v can be used to support the bottom outlet section 29v, the vessel plate sections 22v, the vessel spacer sections 24v and the top plate 27v in place. The alignment rods 25v are screwed into the pre-drilled holes of, or are otherwise securely fastened to, the base section 40v and project out a pre-determined height.

Once the alignment rods 25v are in place, the bottom outlet section 29v can be situated onto the base section 40v using the alignment rods 25v. The bottom outlet section 40v can be configured with multiple pre-molded, cast, or drilled alignment holes to insert the alignment rods 25v through, slide the bottom outlet section 29v down, and couple the bottom outlet section 29v to the base section 40v. Next, a vessel plate section 22v can be situated onto the bottom outlet section 29v using the alignment rods 25v. The vessel plate sections 24v can be configured with multiple pre-molded, cast, or drilled alignment holes to insert the alignment rods 25v through, slide the vessel plate sections 22v down, and couple the vessel plate section 22v to the bottom outlet section 29v, another vessel plate section 22v or the vessel spacer sections 24v. Then, a vessel spacer section 24v can be situated on top of the vessel plate sections 22v using the alignment rods 25v. The vessel spacer sections can be configured with pre-molded, cast, or drilled alignment holes to insert the alignment rods 25v through, similar to the vessel plate sections 22v, bottom outlet section 29v, and the base section 40v. The vessel spacer sections 24v can be slid down the alignment rods 25v until they are situated on top of one of the vessel plate sections 22v. In some implementations, more than one vessel spacer section can be situated on top of the vessel plate sections 22v to create a bigger gap size between at least two of the vessel plate sections 22v in the process vessel 18v.

Once the desired gap size has been created, another vessel plate section 22v can be situated on top of the vessel spacer section 24v using the alignment rods 25v. The vessel plate section 22v can be slid down the alignment rods until it is situated on top of the vessel spacer section 24v.

These steps can be repeated, adding vessel plate sections 22v and vessel spacer sections 24v until the process vessel 18v is configured to the desired size. Once the process vessel 18v has reached the desired size, a top plate 27v can be situated on top on the configuration of vessel plate sections 22v and vessel spacer sections 24v previously installed. An inlet 20v can be formed through the top plate 27v to introduce materials into the process vessel 18v. The top plate 27v can be configured with multiple pre-molded, cast, or drilled alignment holes for the alignment rods 25v to be inserted through. Next, a set of fasteners 36v can secure the top plate 27v to the alignment rods 25v. In doing so, the fasteners 36v can secure the configuration of vessel plate sections 22v and vessel spacer sections 24v together to create the process vessel 18v. In some implementations, the alignment rods 25v can have threaded ends to screw a fastener 36v onto. The fasteners 36v can include a combination of bolts and washers to secure the top plate 27v to the process vessel 18v. In some other implementations, one or more spacer vessel sections 24v can be positioned between the bottom outlet section 40v and the first vessel plate section 22v. Additionally, O-rings can be placed between any two vessel sections to create a better seal between the sections.

Many variations of the present application will occur to those skilled in the art. Some variations include application with post heating. Other variations call for application using thermal spraying. All such variations are intended to be within the scope and spirit of the present application.

Although some implementations are shown to include certain features or steps, the applicants specifically contemplate that any feature or step disclosed herein can be used together or in combination with any other feature or step on any implementation of the present application. It is also contemplated that any feature or step can be specifically excluded from any implementation of the present application.

While the disclosure has been disclosed in connection with the implementations shown and described in detail, various modifications and improvements thereon will become readily apparent to those skilled in the art. Accordingly, the spirit and scope of the present disclosure is to be limited only by the following claims.

What is claimed is:

1. A system for continuously processing a combination of materials, the system comprising:
    an acoustic agitator capable of being removably coupled to a continuous process vessel such that the acoustic agitator is positioned beneath the continuous process vessel; and
    a continuous process vessel coupled to the acoustic agitator comprising:
        a first inlet disposed towards a top portion of the continuous process vessel and configured for introducing at least one process ingredient;
        a plurality of plates stacked below the first inlet along a vertical axis, each plate coupled to and extending from at least a portion of a vessel wall at an angle of declination from horizontal, down towards the acoustic agitator, and configured for directing a flow of the at least one process ingredient across the continuous process vessel and downward from the first inlet through the continuous process vessel, wherein the plurality of plates are capable of transferring acoustic energy generated by the acoustic agitator into the at least one process ingredient; and
        an outlet disposed at a bottom of the continuous process vessel below the first inlet and the plurality of plates, the outlet configured for discharging a product of the at least one process ingredient subsequent to the at least one process ingredient passing through at least a portion of the continuous process vessel while being exposed to the acoustic energy transferred by at least one of the plurality of plates,
            wherein the acoustic agitator is configured to oscillate the entire continuous process vessel such that the system operates at or near a mechanical resonance at a frequency of less than about 1 kHz, while the at least one process ingredient flows downward from the first inlet across the plurality of plates through the continuous process vessel to the outlet via at least a gravitational force.

2. The system of claim 1, wherein the continuous process vessel further comprises a fastener for removably coupling the continuous process vessel to the acoustic agitator.

3. The system of claim 1, wherein the first inlet is positioned in a top of the process vessel.

4. The system of claim 1, wherein the process vessel is configured with multiple levels, each level comprising at least one of the plurality of plates.

5. The system of claim 1, wherein a plate angle of at least two of the plurality of plates are arranged at different angles.

6. The system of claim 5, wherein the plate angle ranges from 1 degree to 75 degrees.

7. The system of claim 1, wherein the surface of at least one of the plurality of plates has a plurality of openings formed throughout to serve as a sieve.

8. The system of claim 1, wherein at least one of the plurality of plates further comprises an orifice to allow the at least one process ingredient to flow to the next level in the process vessel.

9. The system of claim 8, wherein the orifice further comprises a means for adjusting the size of the orifice, wherein the size of the orifice ranges from a few tenths of an inch to several inches.

10. The system of claim 1, further comprising baffles coupled to or formed integrally with the plurality of plates.

11. The system of claim 2, wherein the fastener is substantially permanently affixed to, or formed integrally with, one of the acoustic agitator and the process vessel.

12. The system of claim 2, where in the fastener comprises at least one of a: screw, nut, bolt, clamp, threaded fastener, or latch.

13. The system of claim 1, wherein the process vessel includes detachable sections.

14. The system of claim 13, further comprising multiple fasteners to join the detachable vessel sections of the process vessel together.

15. The system of claim 13, wherein the detachable sections comprise spacer sections and plate sections.

16. The system of claim 1, further comprising a grinding media disposed within the process vessel between at least two of the plurality of plates.

17. The system of claim 1, further comprising a means for controlling the temperature of the plurality of plates.

18. The system of claim 17, further comprising a fluid pathway for carrying coolant to cool the plurality of plates.

19. The system of claim 17, further comprising a fluid pathway for carrying a heated fluid to heat the plurality of plates.

20. The system of claim 17, further comprising a resistive heating element.

21. The system of claim 1, wherein the process vessel further comprises a cavity positioned between an inner wall and outer wall of the process vessel.

22. The system of claim 21, wherein the cavity further comprises a cooling or heating mechanism to control the temperature of the process vessel.

23. The system of claim 1, further comprising a spray nozzle coupled to the process vessel to introduce the plurality of materials in addition to the first inlet.

24. The system of claim 1, further comprising multiple spray nozzles coupled to the process vessel to inject materials into the process vessel and a plurality of extraction ports coupled to the process vessel to extract materials from the process vessel.

25. The system of claim 1, further comprising an outlet valve coupled to the process vessel and a level sensor coupled to the process vessel to control the outlet valve.

26. The system of claim 1, wherein the acoustic agitator is disposed between the continuous process vessel and the ground when the acoustic agitator is oscillating the entire continuous process vessel.

* * * * *